US009613643B2

(12) United States Patent
Peng et al.

(10) Patent No.: US 9,613,643 B2
(45) Date of Patent: Apr. 4, 2017

(54) ALIGNMENT OF OPTICAL COMPONENTS

(71) Applicant: Seagate Technology LLC, Cupertino, CA (US)

(72) Inventors: Chubing Peng, Eden Prairie, MN (US); Amit Sharma, Eden Prairie, MN (US); Kaspar Ko, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 177 days.

(21) Appl. No.: 13/959,440

(22) Filed: Aug. 5, 2013

(65) Prior Publication Data

US 2015/0036137 A1 Feb. 5, 2015

(51) Int. Cl.
*G01B 9/00* (2006.01)
*G11B 5/31* (2006.01)
*G11B 5/105* (2006.01)
*G11B 5/00* (2006.01)

(52) U.S. Cl.
CPC ............ *G11B 5/3166* (2013.01); *G11B 5/105* (2013.01); *G11B 2005/0021* (2013.01)

(58) Field of Classification Search
CPC ...... G01B 9/00; B23Q 17/24; B23Q 17/2404; B24B 49/12; G01C 1/06; G11B 5/314; G11B 5/6088; G11B 5/4866; G11B 13/08; G11B 13/04; G11B 5/4826; G11B 2005/0013; G11B 27/36; G11B 5/59677; G01N 21/64; G11C 13/06
USPC .............. 356/400, 242.1; 359/442, 441, 809, 359/237.1, 237.6, 256 R; 369/13.33, 369/13.13, 13.32, 13.24, 13.02, 13.26, 369/13.01, 13.29, 112.23, 116, 300, 369/110.04; 360/59, 31, 69
See application file for complete search history.

(56) References Cited

U.S. PATENT DOCUMENTS

| | | | | |
|---|---|---|---|---|
| 4,855,792 | A | * | 8/1989 | Holbrook et al. ............... 355/53 |
| 5,386,112 | A | * | 1/1995 | Dixon ................ G02B 21/0052 250/234 |
| 6,429,968 | B1 | * | 8/2002 | Carver .......................... 359/385 |

(Continued)

OTHER PUBLICATIONS

Czichis et al., "Micro Spectroscopy" "Springer Handbook of Materials Measurement Methods", 2006, pp. 549-550.

(Continued)

*Primary Examiner* — Tarifur Chowdhury
*Assistant Examiner* — Mohamed K Amara
(74) *Attorney, Agent, or Firm* — Hollingsworth Davis, LLC

(57) ABSTRACT

Alignment of a near field transducer (NFT) optical input coupler and a light emitting device involves providing excitation radiation from an excitation light source through an optical input coupler to the NFT and filtering output radiation from the NFT using a short wavelength pass optical filter. The optical input coupler is scanned through multiple positions while the photoluminescent radiation is detected. A first alignment position between the NFT input coupler and the excitation light source is identified based on the detected photoluminescent radiation. A light emitting device is scanned through multiple positions the light output is detected by a detector. A second alignment position between the light emitting device and the detector is identified. The first and second alignment positions are used to align the light emitting device with the optical input coupler.

21 Claims, 20 Drawing Sheets

(56) References Cited

U.S. PATENT DOCUMENTS

| | | | |
|---|---|---|---|
| 8,149,653 B2 | 4/2012 | Shimazawa et al. | |
| 8,243,561 B2* | 8/2012 | Matsumoto | G11B 5/105 360/59 |
| 8,358,565 B2* | 1/2013 | Komura | B82Y 20/00 369/13.13 |
| 8,369,191 B2 | 2/2013 | Shimazawa | |
| 8,391,107 B2 | 3/2013 | Gage et al. | |
| 8,393,074 B1* | 3/2013 | Takayama | G11B 5/314 250/201.3 |
| 8,395,971 B2* | 3/2013 | Sasaki | G11B 5/314 369/13.02 |
| 8,406,089 B2* | 3/2013 | Sasaki | G11B 5/314 369/13.02 |
| 8,406,090 B2 | 3/2013 | Juang et al. | |
| 8,432,781 B2 | 4/2013 | Knappmann et al. | |
| 8,753,903 B1* | 6/2014 | Tanner | H01L 22/12 438/16 |
| 8,958,271 B1* | 2/2015 | Peng | G11B 5/314 369/13.13 |
| 9,159,346 B1* | 10/2015 | Cao | G11B 5/4866 |
| 9,202,488 B2* | 12/2015 | Peng | G11B 5/4866 |
| 2007/0177149 A1* | 8/2007 | Aronkyto et al. | 356/417 |
| 2008/0055784 A1* | 3/2008 | Shimazawa et al. | 360/313 |
| 2009/0225464 A1 | 9/2009 | Juang et al. | |
| 2010/0246907 A1* | 9/2010 | Wachman et al. | 382/128 |
| 2011/0055984 A1* | 3/2011 | Cheng et al. | 850/32 |
| 2011/0122402 A1 | 5/2011 | Westphal | |
| 2011/0216635 A1 | 9/2011 | Matsumoto | |
| 2011/0228651 A1 | 9/2011 | Gage et al. | |
| 2011/0228652 A1 | 9/2011 | Gage et al. | |
| 2011/0228653 A1 | 9/2011 | Shimazawa et al. | |
| 2011/0299080 A1 | 12/2011 | Peng | |
| 2012/0090162 A1* | 4/2012 | Shimazawa et al. | 29/603.01 |
| 2012/0092971 A1* | 4/2012 | Schreck et al. | 369/13.24 |
| 2012/0120387 A1 | 5/2012 | Meloni et al. | |
| 2012/0134246 A1 | 5/2012 | Shimazawa | |
| 2012/0163137 A1 | 6/2012 | Wang et al. | |
| 2012/0257488 A1 | 10/2012 | Knappmann et al. | |
| 2013/0126755 A1* | 5/2013 | Kemnitz | 250/459.1 |
| 2013/0135975 A1 | 5/2013 | Gage et al. | |
| 2014/0050486 A1* | 2/2014 | Bain et al. | 398/118 |
| 2015/0036470 A1* | 2/2015 | Balamane et al. | 369/13.33 |

OTHER PUBLICATIONS

Hall, "The Design and Implementation of a Photoluminescence Experiment", Sep. 24, 1999, 10 pages.

International Search Report and Written Opinion dated Aug. 14, 2013 from PCT Application No. PCT/US2013/038005, 10 pages.

U.S. Appl. No. 13/794,706, filed Mar. 11, 2013, Peng et al.

U.S. Appl. No. 13/931,019, filed Jun. 28, 2013, Peng et al.

Peng, "Surface-plasmon resonance of a planar lollipop near-field transducer", Applied Physics Letters, vol. 94 (171106), 2009, pp. 1-3.

Muhlschlegel et al., "Resonant Optical Antennas", Science, vol. 308 (5728), Jun. 2005, pp. 1607-1609.

Apr. 9, 2015, File History for U.S. Appl. No. 13/794,706.

Aug. 3, 2015, File History for U.S. Appl. No. 13/794,706.

\* cited by examiner

ALIGNMENT OF OPTICAL COMPONENTS

SUMMARY

Some embodiments involve an alignment system that includes an excitation light source configured to provide excitation radiation through an optical input coupler to a near field transducer (NFT). A detector assembly comprises a shortwave pass optical filter configured to substantially pass photoluminescent radiation emitted by the NFT in response to the excitation radiation and to substantially block the excitation radiation. The detector assembly also includes a detector configured to detect the photoluminescent radiation and to generate an electrical signal in response to detection of the portion of photoluminescent radiation. An alignment subsystem is configured to identify an alignment position of the optical input coupler based on the electrical signal.

According to some embodiments, an alignment system includes an excitation light source configured to output excitation light through an optical input coupler to a near field transducer (NFT). A first detector assembly comprises a shortwave pass optical filter configured to substantially pass photoluminescent radiation emitted by the NFT in response to the excitation radiation and to substantially block the excitation radiation. The first detector assembly also includes a first detector configured to detect the photoluminescent radiation and to generate an electrical signal in response to detection of the portion of photoluminescent radiation. A second detector assembly includes a second detector arranged to detect light emitted by a light emitting device and to generate at least one second electrical signal in response to detection of the light. The system includes an alignment subsystem configured to use the first electrical signal to identify a first alignment position of the optical input coupler that provides an optimal amount of the photoluminescent radiation and to use the second electrical signal to identify a second alignment position of the light emitting device that provides an optimal amount of the light. The alignment subsystem determines an alignment of the light emitting device and the optical input coupler based on the first and second positions.

Some embodiments are directed to an alignment method. Excitation radiation is emitted from an excitation light source through an optical input coupler to a near field transducer (NFT). The output radiation from the NFT is filtered using a short wavelength pass optical filter, the filtering comprising passing a portion of photoluminescent radiation emitted by the NFT in response to the excitation radiation and substantially blocking the excitation radiation. The portion of photoluminescent radiation emitted by the NFT is detected and an electrical signal in response to detection of the photoluminescent radiation. An alignment position of the optical input coupler with the excitation light source is identified based on the signal.

Some embodiments are directed to a two stage alignment method. Excitation radiation is emitted from an excitation light source through an optical input coupler to a near field transducer (NFT). The output radiation from the NFT is filtered using a short wavelength pass optical filter, the filtering comprising passing a portion of photoluminescent radiation emitted by the NFT in response to the excitation radiation and substantially blocking the excitation radiation. The portion of photoluminescent radiation emitted by the NFT is detected and a first electrical signal in response to detection of the photoluminescent radiation. A first alignment position of the optical input coupler with the excitation light source is identified based on the signal. The first alignment position is associated with an optimal amount of the photoluminescent radiation. Light is emitted from a light emitting device. A second alignment position of the light emitting device is identified, wherein the second alignment position is associated with an optimal amount of the light. The light emitting device is aligned with the optical input coupler based on the first and second alignment positions.

These and other features and aspects of various embodiments may be understood in view of the following detailed discussion and accompanying drawings.

BRIEF DESCRIPTION OF THE DRAWINGS

Throughout the specification reference is made to the appended drawings, where like reference numerals designate like elements, and wherein.

DETAILED DESCRIPTION

Figure 1:
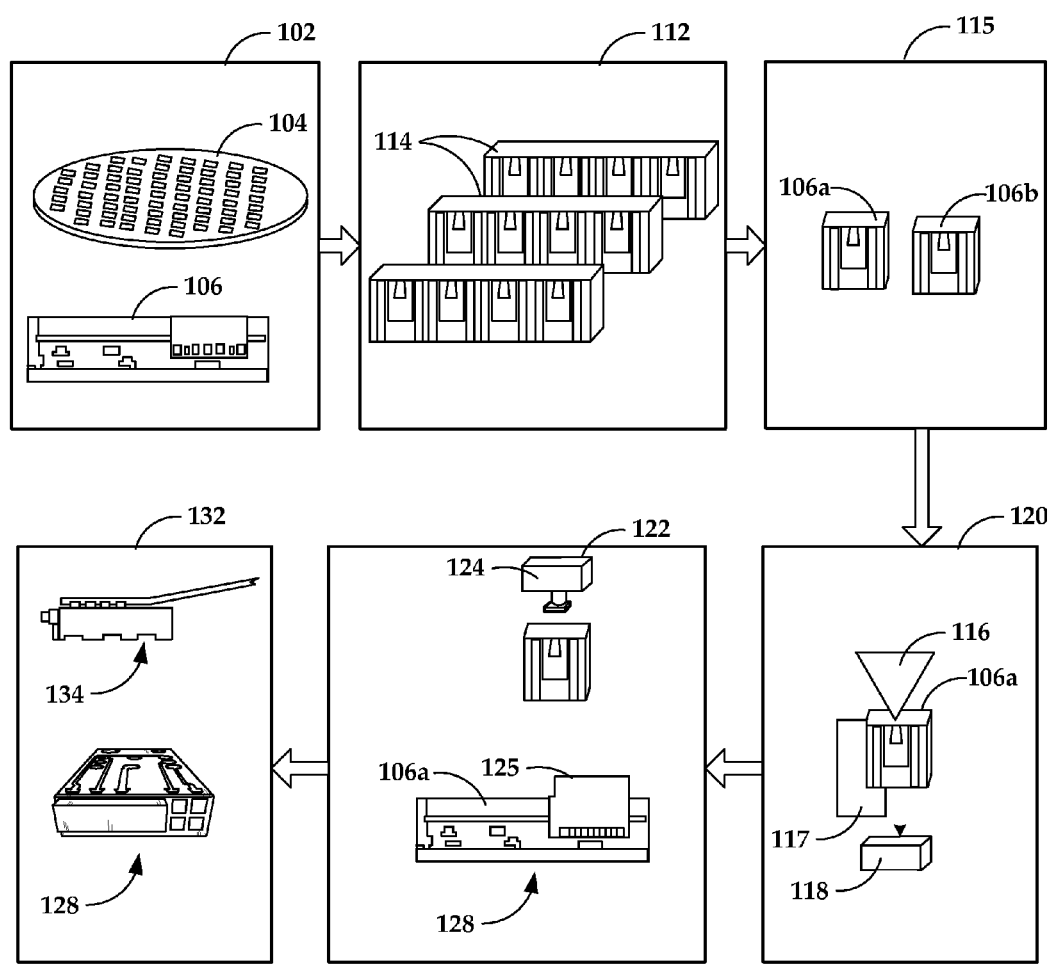
FIG. 1 shows a process flow diagram that illustrates a high-level summary of a portion of a process for fabricating a slider that may include an near field transducer (NFT) characterization step according to the approaches discussed herein.

The present disclosure relates to methods and systems for alignment of optical components used in applications such as heat assisted magnetic recording (HAMR). A HAMR device utilizes a magnetic recording media (e.g., hard disk) that is able to overcome superparamagnetic effects that limit the areal data density of typical magnetic media. In order to record on this media, a small portion of the media is locally heated while being written to by a magnetic write head. A coherent light source such as a laser, e.g., laser diode, can provide the energy to create these hot spots, and optical components, e.g., built in to a slider that houses the write head, are configured direct this energy onto the media.

When applying light to a HAMR medium, light from the light source is concentrated into a small hotspot over the track where writing is taking place. As a result of what is known as the diffraction limit, optical components cannot be used to focus light to a dimension that is less than about half the wavelength of the light. For example, the lasers used in some HAMR designs produce light with wavelengths on the order of 800-900 nm, yet the desired hot spot is on the order of 50 nm or less. Thus the desired hot spot size is well below half the wavelength of the light, and, due to diffraction, optical focusers cannot be used to obtain the desired hot spot size. As a result, an optical near field transducer (NFT) is employed to create these small hotspots on the media.

The NFT is a near-field optics device designed to reach local surface plasmon conditions at a designed wavelength. Example NFT transducers may include a plasmonic optical antenna or a metallic aperture and a focusing element. The focusing element concentrates light on the transducer region (e.g., at the focal region) near where the optical antenna or a metallic aperture is located. Example focusing elements may include solid immersion lenses (SIL), solid immersion mirrors (SIM), and/or three-dimensional channel waveguide for light delivery to a NFT. The NFT is designed to achieve surface plasmon resonance in response to this concentration of light.

Surface plasmons (SPs) are collective oscillations of surface charges that are confined to an interface between a dielectric and a metal. When SPs are resonantly excited by an external optical field, the field amplitude in the vicinity of the surface may be orders of magnitude greater than that of the incident field. Moreover, the region of enhanced field may be tightly confined to a spot much smaller than the incident wavelength. At resonance, a high electric field surrounds the NFT due to the collective oscillations of electrons at the metal surface. Part of this field will tunnel into a storage medium and get absorbed, thereby raising the temperature of a spot on the media as it being recorded.

The NFT may be located near an air bearing surface (ABS) of a slider used for magnetic data storage, and may be placed in close proximity to a write head that is also part of the slider. This co-location of the NFT with the write head facilitates heating the hot spot during write operations. The focusing element, e.g., waveguide, and NFT may be formed as an integral part of the slider that houses the write head. Other optical elements, such as couplers, mirrors, prisms, etc., may also be formed integral to the slider. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may be built up on a substrate using layer deposition techniques. In reference now to FIG. 1, a process flow diagram illustrates a high-level, short summary of a portion of a process for fabricating a slider that includes integrated optics including an NFT and various optical coupling and/or light positioning elements. Block 102 represents a wafer-level stage. A wafer 104 is formed using semiconductor manufacturing processes (e.g., thin film deposition, chemical-mechanical polishing/planarization, etc.) and each wafer 104 generally includes a plurality of sliders (e.g., slider 106) that are later cut into bars for further processing. Each slider 106 includes an NFT subassembly comprising a waveguide focusing element and an NFT.

Block 112 represents an upstream stage where the wafer 104 has been cut into bars 114. Each bar 114 includes a plurality of sliders that are batch-processed. Stage 112 may involve attaching top bond pads (e.g., part of a slider-gimbal electrical interface). Block 115 shows that in some processes the bars are cut in to a number of individual sliders 106a, 106b prior to laser diode alignment and attachment.

Block 120 illustrates light source alignment for an individual slider 106a. In some embodiments, the light source alignment process is performed at the block level before the block is cut into individual sliders. As discussed in more detail herein, some embodiments of the alignment involve placing the slider 106a on a moveable stage 117, exciting the NFT within the slider 114a using an excitation light source 115, and using an alignment system 118 configured to determine a position that provides an optimal amount of photoluminescent radiation from the NFT.

Block 122 represents a laser attach stage. The optimal alignment coordinates obtained from block 120 are used to position the laser prior to attachment. The laser (e.g. laser diode 125) may be placed on the slider using a pick-and-place machine 124, and thereafter bonded to the slider (e.g., slider 106a with laser installed) via a reflow operation (e.g., application of heat to melt the solder bumps) to form assembly 128. Block 132 represents a stage for forming a head-gimbal assembly (HGA). Additional optical, electrical and/or magnetic tests may be performed on the completed head-gimbal assembly 134. In some cases, the manufacturing process may be facilitated by testing the NFT subassemblies at the bar stage before proceeding with the laser attachment and subsequent manufacturing steps.

Figure 2:
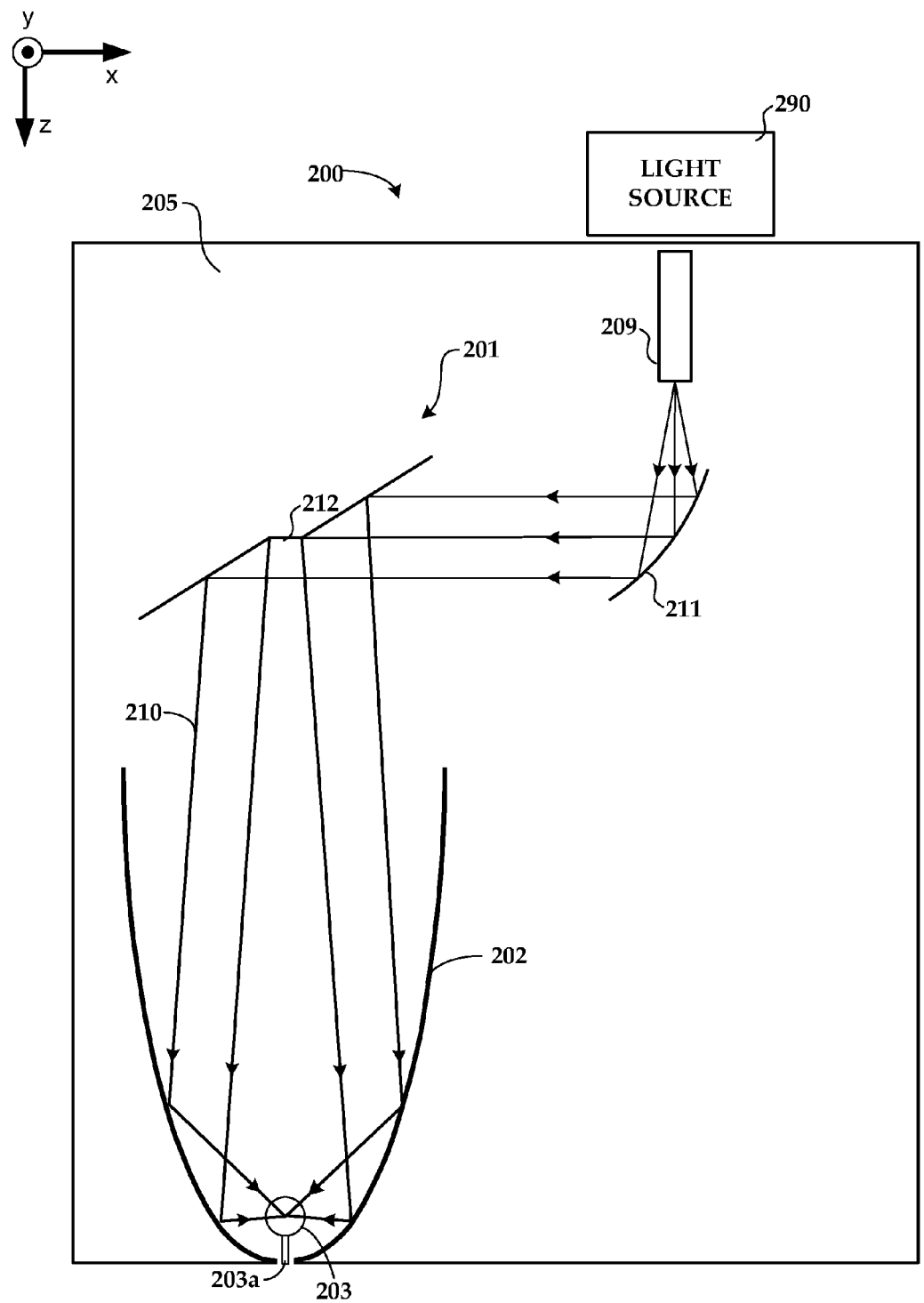
FIGS. 2, 3, 4A, and 4B provide a cross-sectional diagrams that illustrate various NFT subassemblies that can be characterized for alignment with a light emitting device using the approaches discussed herein.

FIG. 2 provides a cross-sectional diagram that illustrates one example of a portion of a slider that includes NFT subassembly 200. The NFT subassembly shown in FIG. 2 represents an end-fire arrangement. NFT subassembly 200 may be incorporated into a slider and the optical input coupler 209 of the NFT subassembly 200 may be aligned with a light emitting device 290 according to alignment approaches discussed herein.

The NFT subassembly 200 shown in FIG. 2 is fabricated in a slider 205 and includes optical input waveguide coupler 209, first mirror 211, second mirror 212, solid immersion mirror (SIM) 202, and NFT optical antenna 203. NFT subassemblies 200 that operate by end-fire technique as shown in FIG. 2 may in incorporated into each slider 106 of a bar 114 shown in FIG. 1. The NFT subassembly 200 illustrates one particular configuration, although it will be appreciated that many configurations of NFT subassemblies are possible and can be characterized using the approaches discussed herein.

In the example illustrated in FIG. 2, the NFT subassembly 200 receives light emitted from a light source 290 via an input waveguide coupler 209 which is a three-dimensional channel waveguide of finite wide waveguide core. In normal use, the light source 290 may comprise an edge emitting or surface emitting laser diode, for example. The light emerging from the waveguide coupler 209 is directed in a solid immersion mirror (SIM), or planar solid immersion mirror (PSIM) indicated by way of SIM sidewall 202 in FIG. 2, by a first mirror 211 and a second mirror 212. An NFT 203 is located at the focus point of the SIM 202.

The NFT 203 shown in FIG. 2 comprises a "lollipop" configuration that combines a circular disc with a peg, although other configurations may be used. The lollipop dimensions are selected to function as an antenna for the incident light, to resonate at the excitation wavelength, and to transfer energy into the peg and thus to the medium via the feedgap at the tip 203a of the NFT 203. The NFT is a transducer that can be made of any plasmonic material (e.g., Au, Ag, Cu, ZrN) and may be positioned at or near the focal region of the light 210.

The waveguide core 201 may be formed from any material that has a higher index of refraction than cladding. For example, the waveguide core 201 may be made from $Ta_2O_5$, $TiO_2$, ZnS, SiN. The PSIM 202 may be formed as a parabolic cutout of surrounding dielectric waveguide material (e.g., $Al_2O_3$, $SiO_2$, $SiOxNy$, MgO, $HfO_2$, $Y_2O_3$, $Ta_2O_5$, TiOx). The cutout may be formed from/coated with a reflective material (e.g., Au, Al), so that light rays 210 entering the PSIM 202 by way of waveguide core 201 are focused to a focal region to strongly couple to the NFT 203 and generate surface plasmons.

Figure 3:
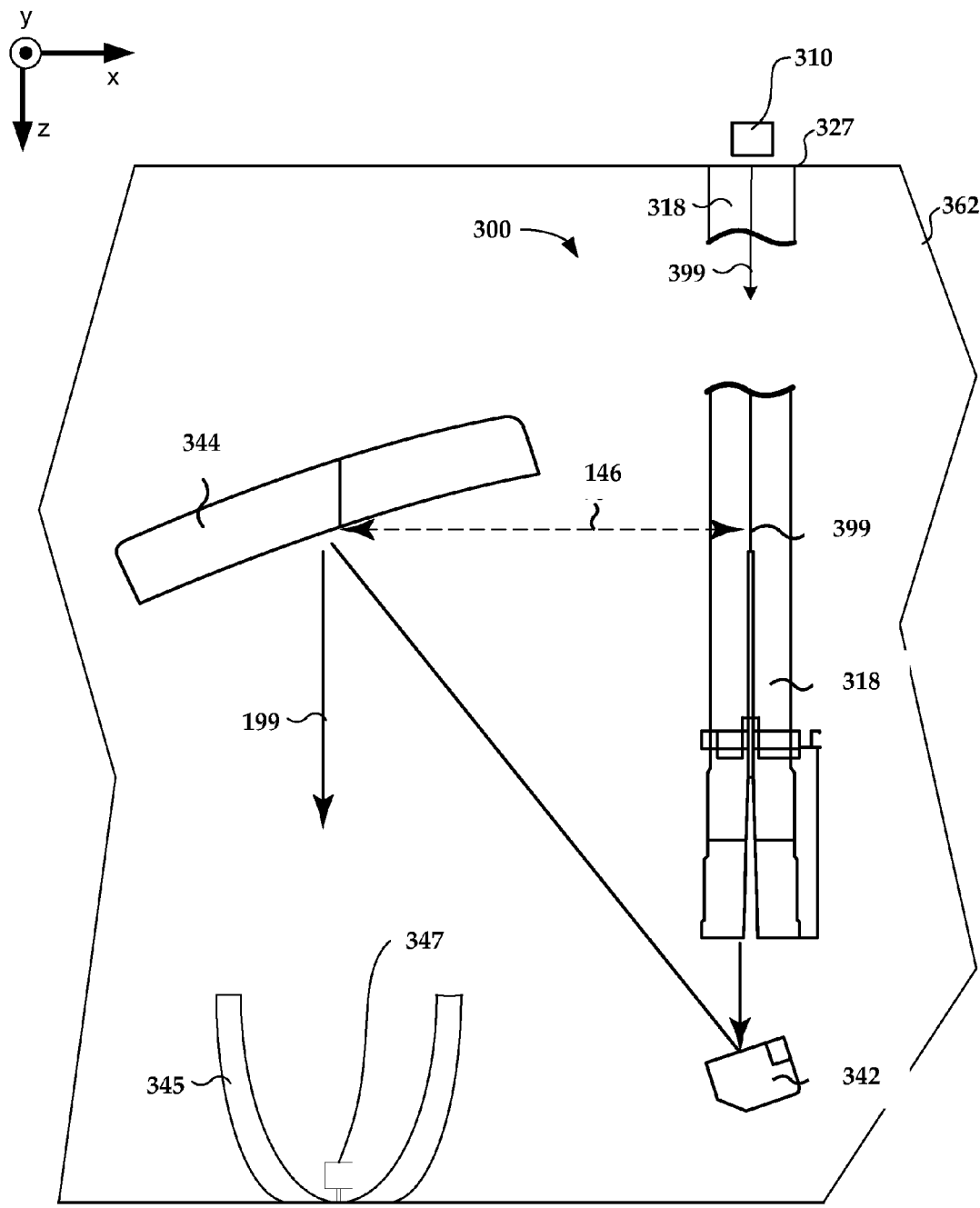

FIG. 3 shows another configuration for an NFT subassembly 300 that may be incorporated into a slider. NFT subassembly 300 may be incorporated into a slider and the optical input coupler 318 of the NFT subassembly 300 may be aligned with a light emitting device 310 according to alignment approaches discussed herein.

FIG. 3 shows the light source 310 positioned at a mounting surface 327 of the slider 362. In the configuration of FIG. 3, the light delivery path includes three mirrors, two directional mirrors 342, 344 and the SIM 345. The NFT 347 is offset from the waveguide input coupler 318 along the x axis by a distance, e.g., about 102 micrometers (μm). Light path 399 passes through waveguide input coupler 318 to a first reflecting mirror 342. Light reflected by mirror 342 encounters a second reflecting mirror 344 which redirects the light 399 toward SIM 345 which focuses the light on the NFT 347.

Figure 4A:
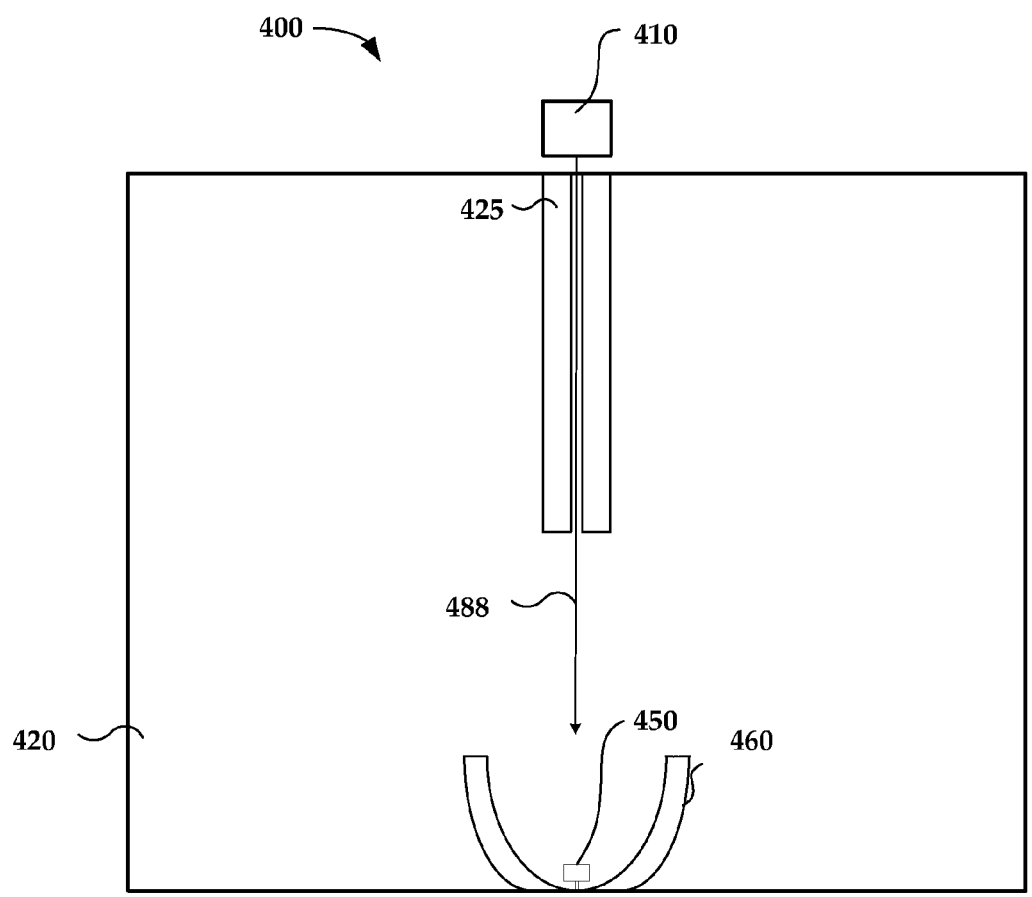

FIG. 4A illustrates an NFT subassembly 400 that has a straight through light path. NFT subassembly 400 may be incorporated into slider 420 and the optical input coupler 425 of the NFT subassembly 400 may be aligned with a light emitting device 410 according to alignment approaches discussed herein.

In this configuration, a waveguide input coupler 425 couples light into a light delivery path 488 within the slider 420. Light from light source 410 is coupled into light delivery path 488 through the optical input coupler 425, which comprises a waveguide. The optical input coupler 425 carries light to the SIM 460 which focuses the light onto the NFT 450.

Figure 4B:
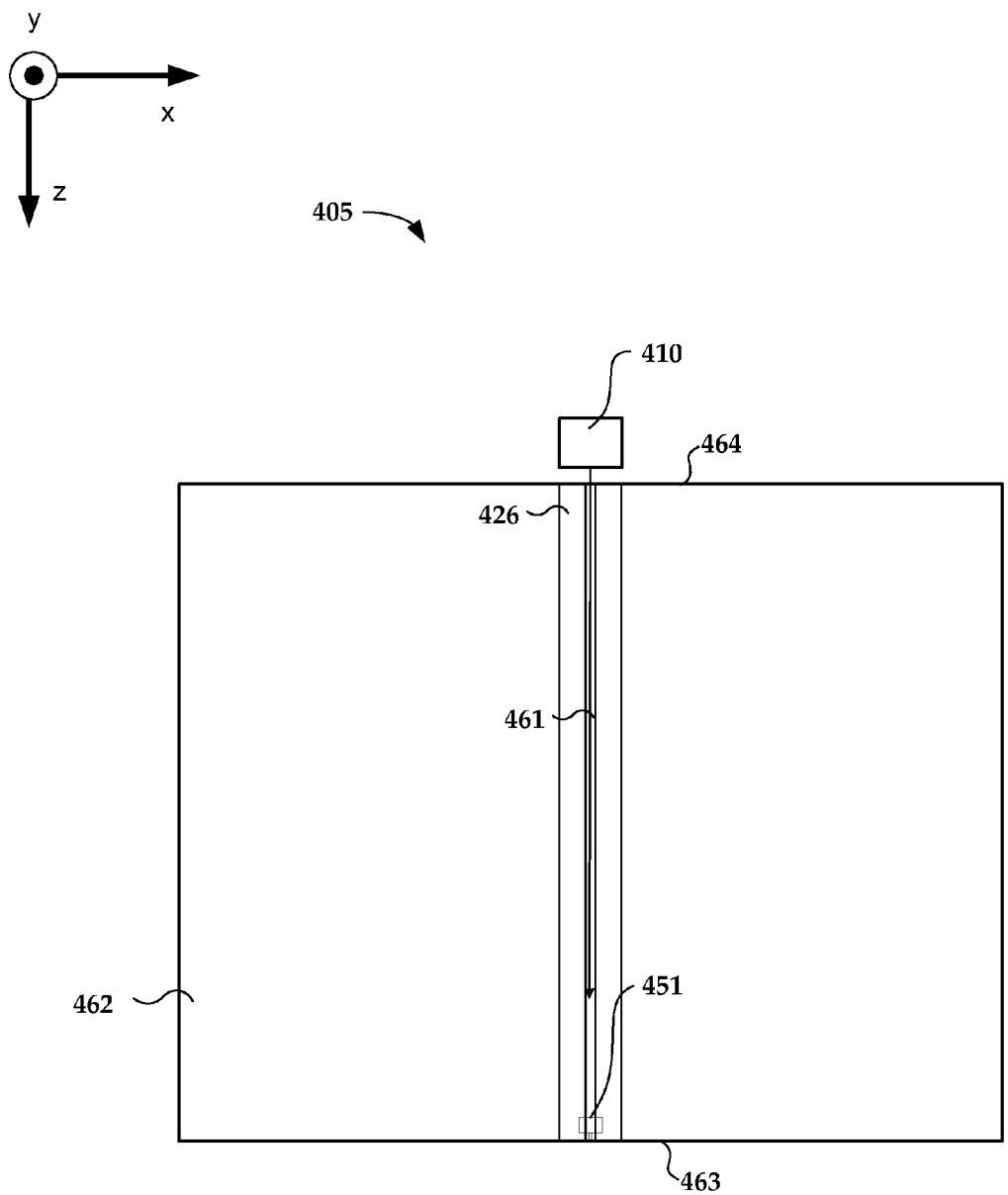

FIG. 4B illustrates an NFT subassembly 405 that has a straight through light path and does not include a SIM. NFT subassembly 405 may be incorporated into a slider 462 and the optical input coupler 426 of the NFT subassembly 405 can be aligned with a light emitting device 410 according to alignment approaches discussed herein.

In this configuration, an optical input coupler 426 couples light into a light delivery path 461 within the slider 420. As shown in this example, the optical input coupler 426 may be a waveguide that extends toward the NFT and is configured to carry the light that couples in from the light emitting device 410 to the NFT 451. In various configurations, the waveguide 426 extends at least a majority of the distance between the slider surface 464 and the air bearing surface (ABS) 463 and may extend the entire distance. FIG. 4B shows a waveguide 426 that extends the entire distance between surface 464 and the ABS 463. The NFT 451 could be placed in a waveguide cladding layer, e.g., a cladding layer between the NFT and magnetic write pole, or the NFT 451 could be positioned within the waveguide 426 at or near the end of waveguide. A SIM is not included in the embodiment illustrated in FIG. 4B.

Figure 5A:
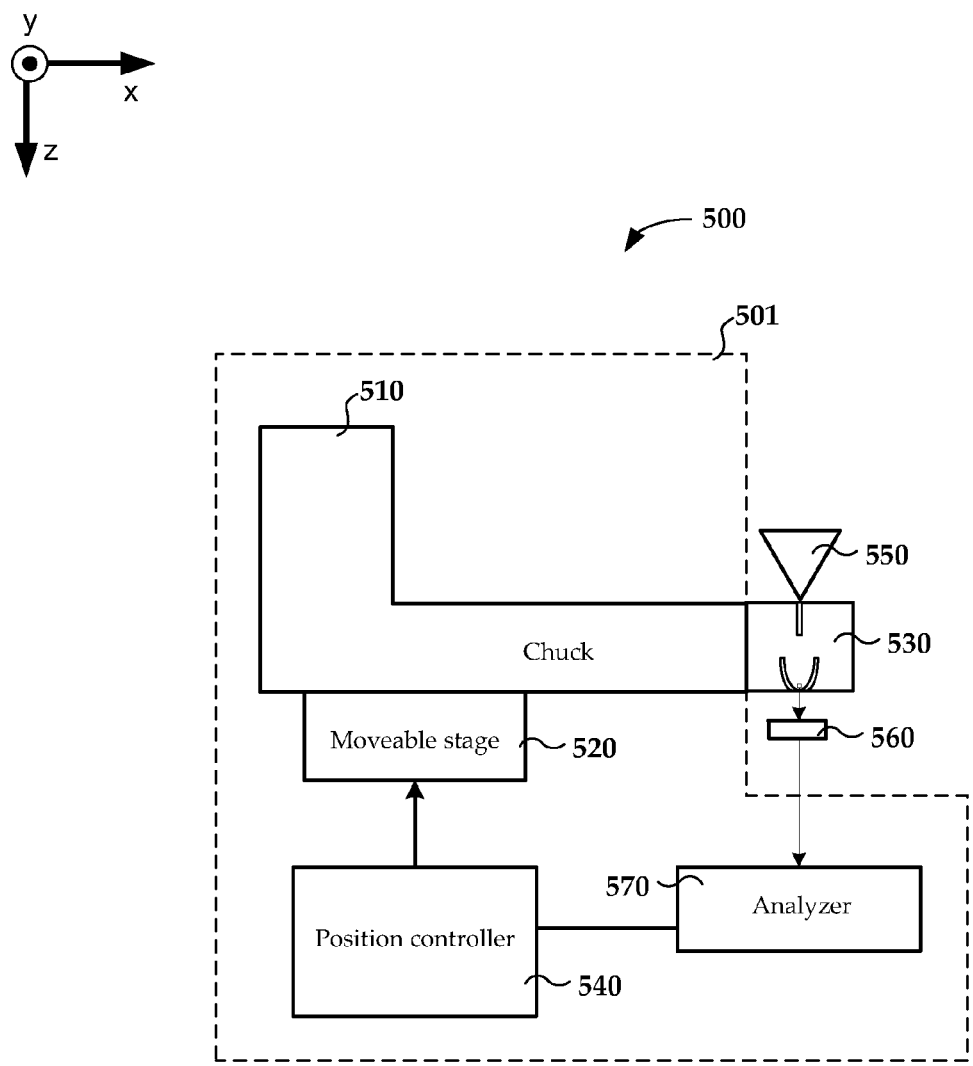
FIGS. 5A-5D are block diagrams of systems that can be used for optical alignment according to various embodiments.

FIG. 5A depicts a block diagram of a system 500 that includes an alignment subsystem 501 in accordance with some embodiments. The alignment subsystem 501 includes a slider chuck 510 configured to couple to a slider 530 and to hold the slider 530 securely during the alignment process. The slider may incorporate an NFT subassembly as depicted by NFT subassemblies 200, 300, 400. 405 in FIGS. 2, 3, 4A and 4B or may incorporate a different type of NFT subassembly. The slider chuck 510 is attached to a moveable stage 520. The position of the moveable stage 520 is controllable by the alignment position controller 540. For example, the moveable stage 520 may be or may comprise a uni-dimensional or multidimensional piezoelectric actuator controllable along x, y, and/or z axes by electrical signals output by the position controller 540. For example, the moveable stage 540 may be capable of moving the chuck 510 (with attached slider 530) along one or more of x, y, and z axes.

An excitation light source 550 emits light toward the optical input coupler of the NFT subassembly disposed within the slider. In some embodiments, the excitation light source is the light emitting device has dimensions and configuration suitable for incorporation into the slider 540 to serve as the heat generating component of the HAMR slider.

As discussed in more detail below, the characterization technique used for alignment of the light emitting device 550 with the slider may involve the relatively high power excitation light. The power of the excitation light should be sufficiently high to directly excite electrons, causing the NFT to emit photoluminescent radiation. However, the excitation light should not damage the NFT or other slider components. To prevent NFT damage, this relatively high power excitation light is supplied in the form of femtosecond, sub-picosecond, or picosecond pulses. The pulsed light can be provided at a power that causes the NFT to emit photoluminescent radiation by two photon excitation, whereas continuous excitation light at these power levels may cause overheating of the device itself or slider components.

In the system 500 shown in FIG. 5A, the excitation light source 550 may be a laser diode suitable for incorporation into a HAMR slider. In some embodiments, the excitation light source 550 emits picosecond pulsed excitation light during the alignment process. The excitation light causes the NFT in the slider 530 to emit photoluminescent radiation that is detected by characterization subassembly 560. The characterization subassembly 560 generates an electrical signal in response to the radiation emitted by the NFT. An analyzer 570 receives the electrical signal and identifies an alignment position of optical input coupler within the slider 530 that produces optimal photoluminescent output from the NFT. For example, to identify the alignment position, the analyzer 570 may correlate an amplitude of the electrical signal to position as the position controller 540 controls the moveable stage 520 to move the slider 530 through multiple positions along one or more axes. The analyzer 570 may identify the alignment position by detecting a peak of the electrical signal along one or more axes, where the peak of the electrical signal indicates peak output of the NFT.

Figure 5B:
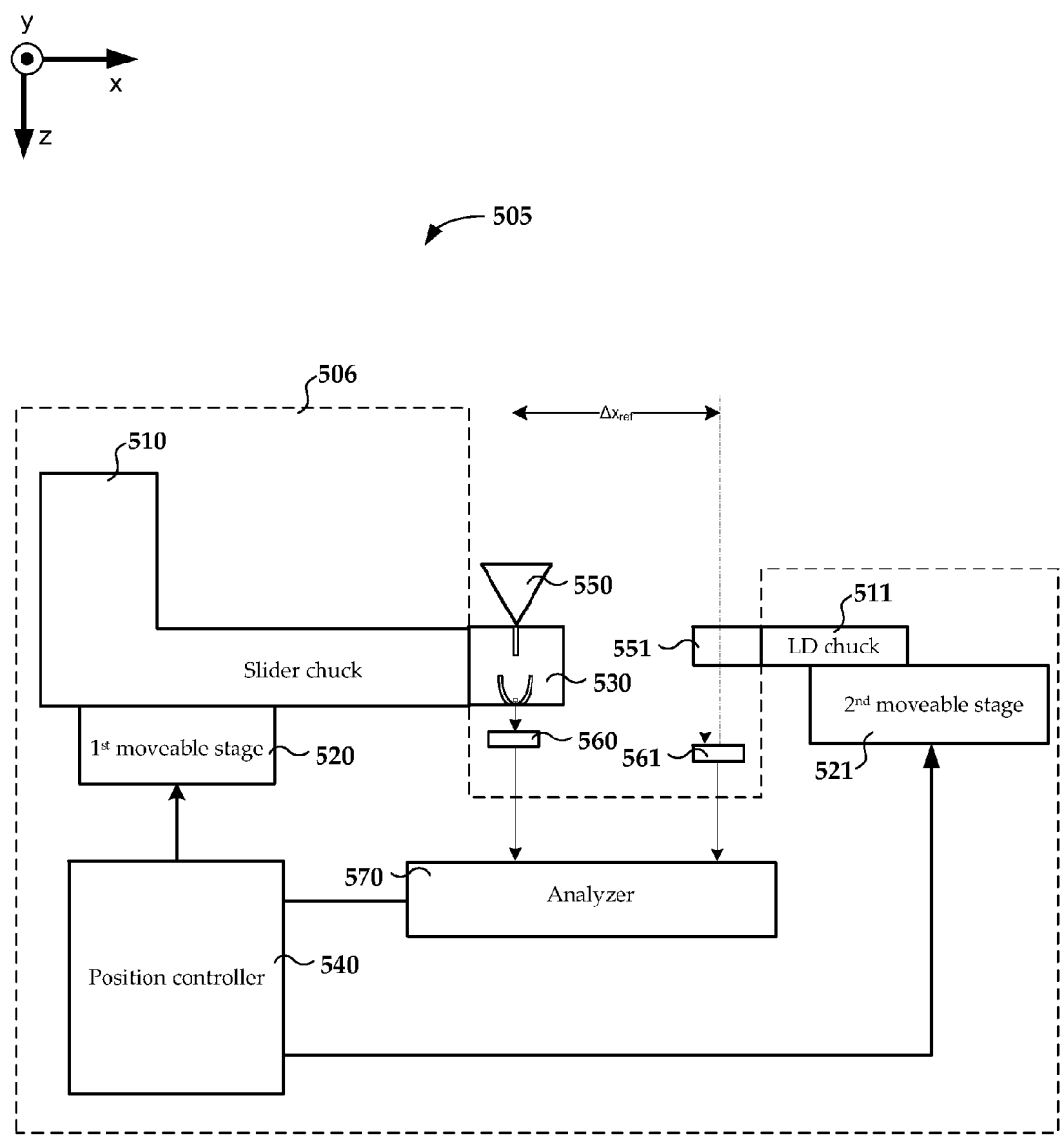

FIG. 5B depicts a block diagram of a system 505 that includes an alignment subsystem 506 in accordance with some embodiments. The system of FIG. 5B may be useful when a light emitting device (LD) to be installed in a HAMR slider cannot be used directly for alignment because the LD is not configured to emit light pulses at the power or frequency (e.g., picosecond or less pulses) suitable for the particular characterization technique used for alignment.

The alignment subsystem 506 includes a slider chuck 510 configured to couple to a slider 530 and to hold the slider 530 securely during the alignment process. The slider may incorporate an NFT subassembly as depicted by NFT subassemblies 200, 300, 400, 405 in FIGS. 2, 3, 4A and 4B or a different type of NFT subassembly. The slider chuck 510 is attached to a first moveable stage 520. The position of the first moveable stage 520 is controllable by the alignment position controller 540. For example, the first moveable stage 520 may be or may comprise a uni-dimensional or multidimensional piezoelectric actuator controllable by electrical signals output by the position controller 540. For example, the first moveable stage 540 may be capable of moving the slider chuck 510 (with attached slider 530) along one or more of x, y, and z axes.

An excitation light source 550 emits light toward the optical input coupler of the NFT subassembly disposed within the slider 530. For example, the excitation light source 550 may be configured to emit pulsed laser light, e.g., femtosecond, sub-picosecond, or picosecond light pulses, toward the slider 530.

The alignment subsystem 506 includes a LD chuck 511 configured to couple to a light emitting device (LD) 551 and to hold the light emitting device 551 securely during the alignment process. In some implementations, after alignment, the light emitting device 551 is installed in HAMR slider 530 in a subsequent processing step. The LD chuck 511 is attached to a second moveable stage 521. The position of the second moveable stage 521 is controllable by the alignment position controller 540. For example, the second moveable stage 521 may be or may comprise a uni-dimensional or multidimensional piezoelectric actuator controllable along x, y, and/or z axes by electrical signals output by the position controller 540. For example, the second moveable stage 540 may be capable of moving the LD chuck 510 (with attached LD 551) along one or more of x, y, and z axes.

As discussed in more detail below, the characterization technique used for alignment of the light emitting device 551 with the slider 530 may involve a two stage process that may be performed concurrently or consecutively in time. The first stage involves determining an alignment position of the slider 530. The second stage process involves determining an alignment position of the light emitting device 551. As described below, in some embodiments, the alignment positions are determined with respect to first and second reference coordinates, where the first and second reference coordinates are at calibrated positions with respect to each other.

In the system 505 shown in FIG. 5B, the excitation light source 550 may be a laser light source that is unsuitable for incorporation into a HAMR slider, and that provides high power excitation light pulses in the femtosecond, sub-picosecond, or picosecond range during the alignment process. The high power, short duration pulses are configured to excite the NFT to emit photoluminescent radiation that is detected by a first detector in the NFT characterization subassembly 560. A first detector in the characterization subassembly 560 generates an electrical signal in response to the radiation emitted by the NFT. An analyzer 570 receives the electrical signal and identifies an alignment position $(x_{1\text{-}align}, y_{1\text{-}align}, z_{1\text{-}align})$ of the optical input coupler within the slider 530 that produces optimal photoluminescent output from the NFT.

In the first stage process, the alignment position of the optical input coupler of the slider is identified with respect to first reference coordinates, e.g., $(x_{1\text{-}ref}, y_{1\text{-}ref}, z_{1\text{-}ref})$, wherein $(x_{1\text{-}ref}, y_{1\text{-}ref}, z_{1\text{-}ref})$ may be coordinates of a point at which the excitation laser light beam is emitted by the excitation light source 550. In some embodiments, to identify the alignment position of the optical input coupler of slider 530, the analyzer 570 may correlate an amplitude of the first electrical signal to position of the slider 530 as the position controller 540 controls the first moveable stage 520 to move the slider 530 through multiple positions along one or more axes. The analyzer 570 may identify the alignment position by detecting a peak amplitude of the first electrical signal along one or more axes, where the peak amplitude of the first electrical signal indicates peak output of the NFT.

In the second stage process, the alignment position of the light emitting device 551 is identified with respect to second reference coordinates, e.g., $(x_{2\text{-}ref}, y_{2\text{-}ref}, z_{2\text{-}ref})$ wherein $(x_{2\text{-}ref}, y_{2\text{-}ref}, z_{2\text{-}ref})$ may correspond to a point of detector subassembly 561, e.g., an aperture or a balance point of a quadrant photodetector. The x, y, and z offsets between the first and second reference coordinates are denoted $\Delta x_{ref}$, $\Delta y_{ref}$, $\Delta z_{ref}$, respectively, where $\Delta x_{ref} = (x_{1\text{-}ref} - x_{2\text{-}ref})$; $\Delta y_{ref} = (y_{1\text{-}ref} - y_{2\text{-}ref})$; and $\Delta z_{ref} = (z_{1\text{-}ref} - z_{2\text{-}ref})$. The offsets $\Delta x_{ref}$, $\Delta y_{ref}$, $\Delta z_{ref}$ are known and/or may be calibrated to known values.

The light emitting device 551 is energized, emits light, and a second detector of detector subassembly 561 generates a second electrical signal in response to the light emitted by the light emitting device 551. The analyzer 570 receives the second electrical signal from the second detector 561 and identifies an alignment position $(x_{2\text{-}align}, y_{2\text{-}align}, z_{2\text{-}align})$ of the light emitting device 551 that produces optimal light output from the light emitting device 551.

In some embodiments, to identify the alignment position of the light emitting device 551, the analyzer 570 may correlate an amplitude of the second electrical signal to position of the light emitting device 551 as the position controller 540 controls the second moveable stage 521 to move the light emitting device 551 through multiple positions along one or more axes. The analyzer 570 may identify the alignment position by detecting a peak of the second electrical signal along one or more axes, where the peak of the second electrical signal indicates peak output of the light emitting device.

The first and second stage processes may be performed concurrently or may be performed consecutively, with either stage process occurring first in time. Thus the terms "first" and "second" as used herein are not meant to imply any particular order or priority, and are only used for purposes of identification. Alignment of the light emitting device to the optical input coupler can be achieved based on: 1) the alignment position of the optical input coupler, $(x_{1\text{-}align}, y_{1\text{-}align}, z_{1\text{-}align})$, which is the position of the optical input coupler of the slider with respect to the excitation light beam that provides optimal NFT output; 2) the alignment position of the light emitting device, $(x_{2\text{-}align}, z_{2\text{-}align})$ which is the position of optimal light output from the light emitting device, and the reference position offsets $\Delta x_{ref}$, $\Delta y_{ref}$, $\Delta z_{ref}$.

Figure 5C:
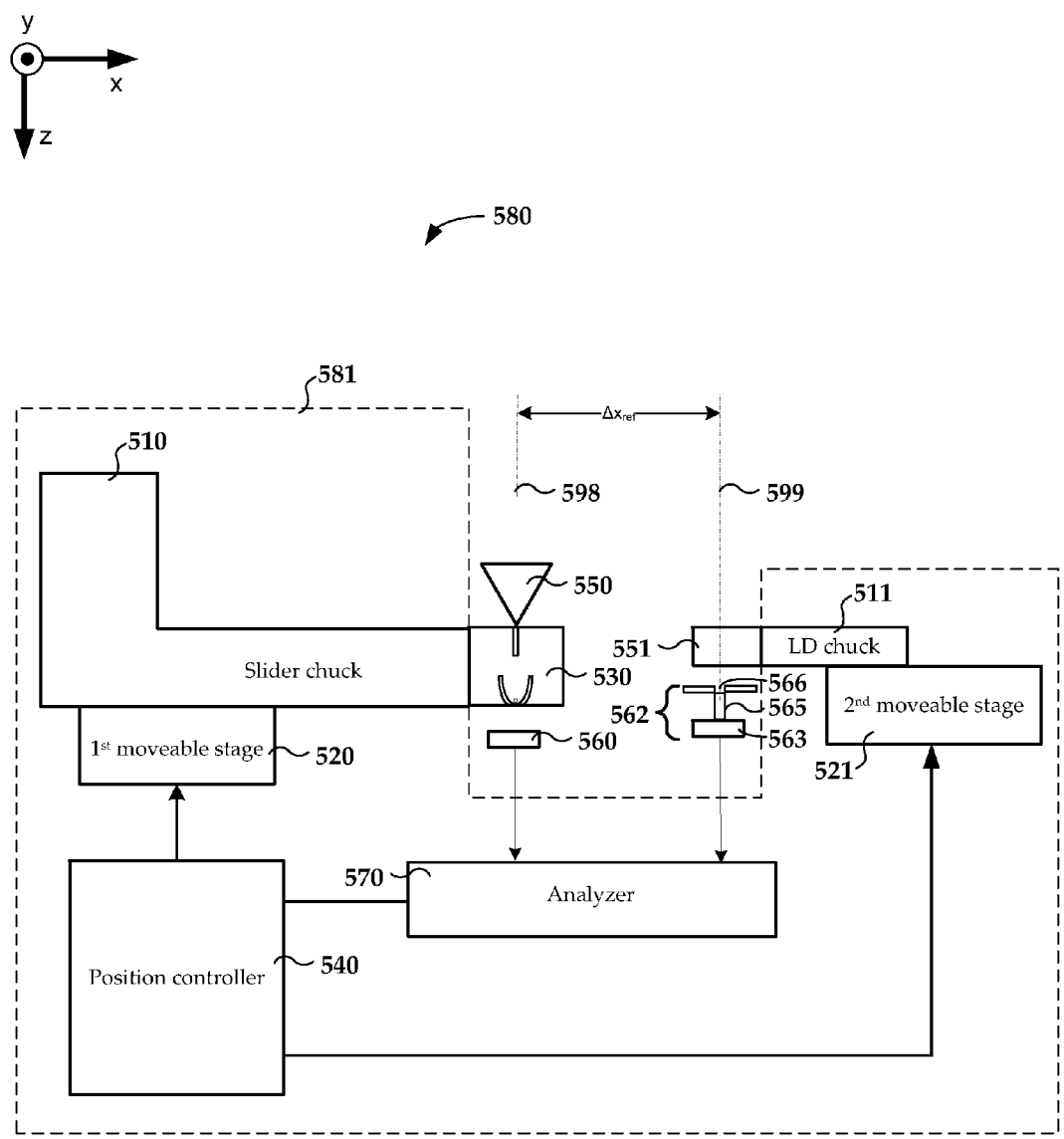

FIG. 5C shows an system 580 that is similar in many respects to the system 505 of FIG. 5B. Alignment subsystem 581 comprises detector subassembly 562 that includes an aperture plate with aperture 566, an optical fiber waveguide 565 and a photodetector 563. Light from the light emitting device 551 travels through aperture 566, waveguide 565 to photodetector 563. In this embodiment, the second reference position 599 $(x_{2\text{-}ref}, y_{2\text{-}ref}, z_{2\text{-}ref})$ corresponds to the aperture 566, e.g., the center of aperture 566. The first reference position 598 $(x_{1\text{-}ref}, y_{1\text{-}ref}, z_{1\text{-}ref})$ corresponds to the point where the laser light emerges from the excitation light source 550. As shown in FIG. 5C, the offset between the reference positions along the x axis is $\Delta x_{ref}$.

Figure 5D:
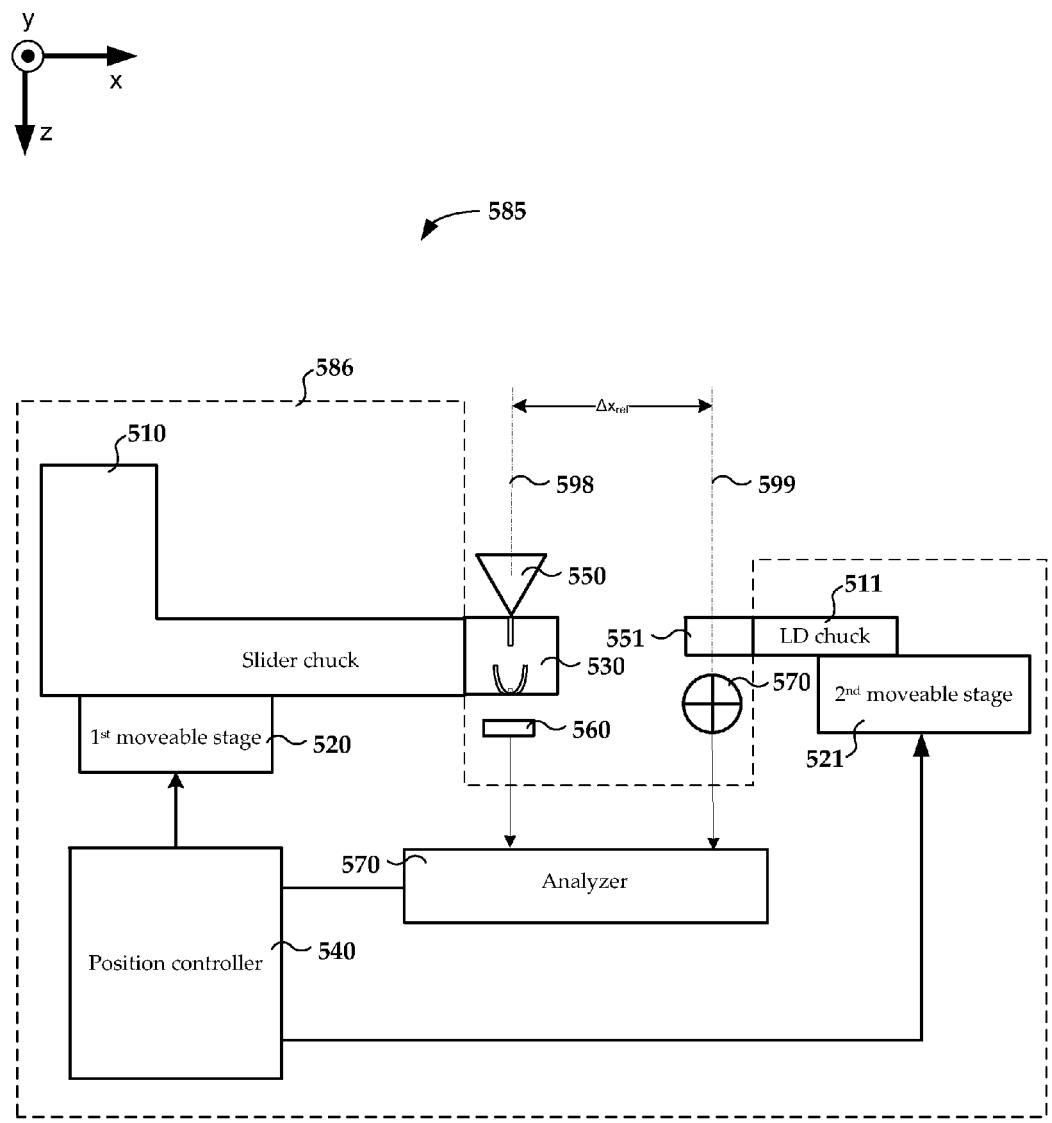

FIG. 5D illustrates a system 585 that is similar in many respects to the system 505 of FIG. 5B. Alignment subsystem 586 comprises detector subassembly 570 that includes a quadrant photodetector 570. Light from the light emitting device is incident on quadrant photodetector 570. The quadrant photodetector comprises four separate photosensitive surfaces each separated by a small gap. The quadrant photodetector is sized so that the laser beam from the light emitting device fits inside the total quadrant area. Although light falls on all four quadrants, the difference between the left and right quadrants (A output) and top and bottom quadrants (B output) are zero if the beam is centered at the balance point of the quadrant photodetector. In this embodiment, the second reference position 599 ($x_{2-ref}$, $y_{2-ref}$, $z_{2-ref}$) corresponds to the balance point of the quadrant photodetector. The first reference position 598 ($x_{1-ref}$, $y_{1-ref}$, $z_{1-ref}$) corresponds to the point where the laser light emerges from the excitation light source 550. As shown in FIG. 5D, the offset between the reference positions along the x axis is $\Delta x_{ref}$.

Various techniques for characterizing NFT output may be employed to determine the alignment position of the optical input coupler of the slider with respect to an excitation light beam, several of which are described below. It will be appreciated that other techniques for characterizing NFT output are known and the alignment processes discussed herein encompass any suitable NFT characterization technique can be used. These NFT characterization techniques may be employed, for example, by NFT characterization subassembly 560 shown in FIGS. 5A and 5B. The alignment processes discussed herein can be performed at the bar stage, or can be performed on individual sliders prior to laser placement, for example.

Dark field microscopy has been attempted to characterize optical antennas by measuring the light scattering from NFT, however this characterization technique is not suitable for in the presence of an incident beam ("bright field") in actual devices. Characterization of the NFT by the thermo-reflectance pump/probe method measures optical changes due to absorption of the NFT, however, the pump/probe method can suffer from variation due to thermal environment. Some characterization methods are be insensitive to certain parameters that are useful to track in a manufacturing environment.

According to some embodiments discussed herein, characterization of the NFT subassemblies may be accomplished by sensing filtered photoluminescent radiation emitted by the NFT in response to high energy excitation radiation. The photoluminescent radiation is strongly enhanced by the local surface plasmons that are generated at the NFT surface. The photoluminescent radiation generated in the NFT includes wavelengths shorter than the excitation radiation by two-photon excitation. Two-photon luminescence is luminescence excited by two-photon absorption. Two-photon induced photoluminescence in noble metals such as gold and silver is generally considered as a three-step process. Electrons from occupied d bands are first excited by two-photon absorption to unoccupied states of the sp-conduction band. Second, subsequent intraband scattering processes move the electrons closer to the Fermi level. Third, the relaxation of the electron-hole pair recombines either through nonradiative processes or by emission of luminescence. The emission of luminescence is proportional to $E^4$, where E denotes the electric-field amplitude. Local surface plasmons at the surface of the NFT enhance the luminescence significantly.

In various configurations, the characterization system includes shortwave pass spectral filters, notch filters and/or beam splitters with a wavelength edge that are used to separate the bright field light (e.g., the excitation light) from the photoluminescent light emanating from the NFT.

An example subsystem for characterizing NFT subassemblies in accordance with some embodiments is described with reference to FIGS. 6 and 7A-7C. The example characterization subsystem may be used, for example, as subsystem 560 depicted in FIG. 5B. An excitation light source 601 emits excitation radiation 603 that passes through a focusing lens 605 and illuminates a slider 611 comprising an optical input coupler and NFT. FIG. 7A provides an exemplary spectral distribution of the focused excitation radiation 606 that is centered at wavelength $\lambda_E$. The spectral distribution diagrams of FIGS. 7A-C are idealized as Gaussian distributions of arbitrary peak magnitudes, however, it will be appreciated that, in general, the distributions need not be Gaussian. In response to the excitation radiation 606, the NFT in slider 611 emits white-light super-continuum photoluminescence 613 at the feedgap and tip of the optical antenna (e.g., see, 203a, FIG. 2). A portion of the excitation radiation 606 that is not absorbed in the NFT is also transmitted through the slider 611.

An exemplary spectral distribution of the electromagnetic radiation 612 emerging from the NFT of the slider 611 that includes both a photoluminescent radiation component 613 and an excitation radiation component 606, is shown in FIG. 7B. In this example, the photoluminescent radiation component 613 is shown as having an arbitrary peak or central wavelength, $\lambda_L$, and the excitation radiation component 606 is shown as having an arbitrary peak or central wavelength, $\lambda_E$. Although the idealized spectral distributions and magnitudes of FIGS. 7A-7C do not necessarily correspond to actual spectral distributions and magnitudes of the photoluminescent and excitation radiation, FIG. 7C illustrates that the photoluminescent radiation 713 emitted by the NFT includes shorter wavelength radiation and/or has shorter peak or central wavelength when compared to the excitation radiation 706.

The radiation 612 that emerges from the NFT of slider 611 is collected and collimated by a lens 616 and passes through a shortwave pass filter 620 having a cutoff wavelength, $\lambda_F$. The shortwave pass filter 620 substantially removes components of the radiation 612 having a wavelength longer than $\lambda_F$. As such, the shortwave pass filter 620 substantially absorbs or blocks the excitation radiation component 606 and also absorbs or blocks that portion of the photoluminescent radiation that has wavelength greater than $\lambda_F$. The shortwave pass filter substantially passes wavelengths of the photoluminescent radiation with wavelengths greater than $\lambda_F$, including radiation 625 shown in FIG. 7C.

Returning now to FIG. 6, the filtered radiation 625 impinges on a detector 630, such as a photomultiplier tube (PMT), or solid state photodetector. The photodetector provides an electrical signal output 635 in response to the incident filtered radiation 625 that can be used to measure the filtered photoluminescent radiation emitted by the NFT.

Figure 8:
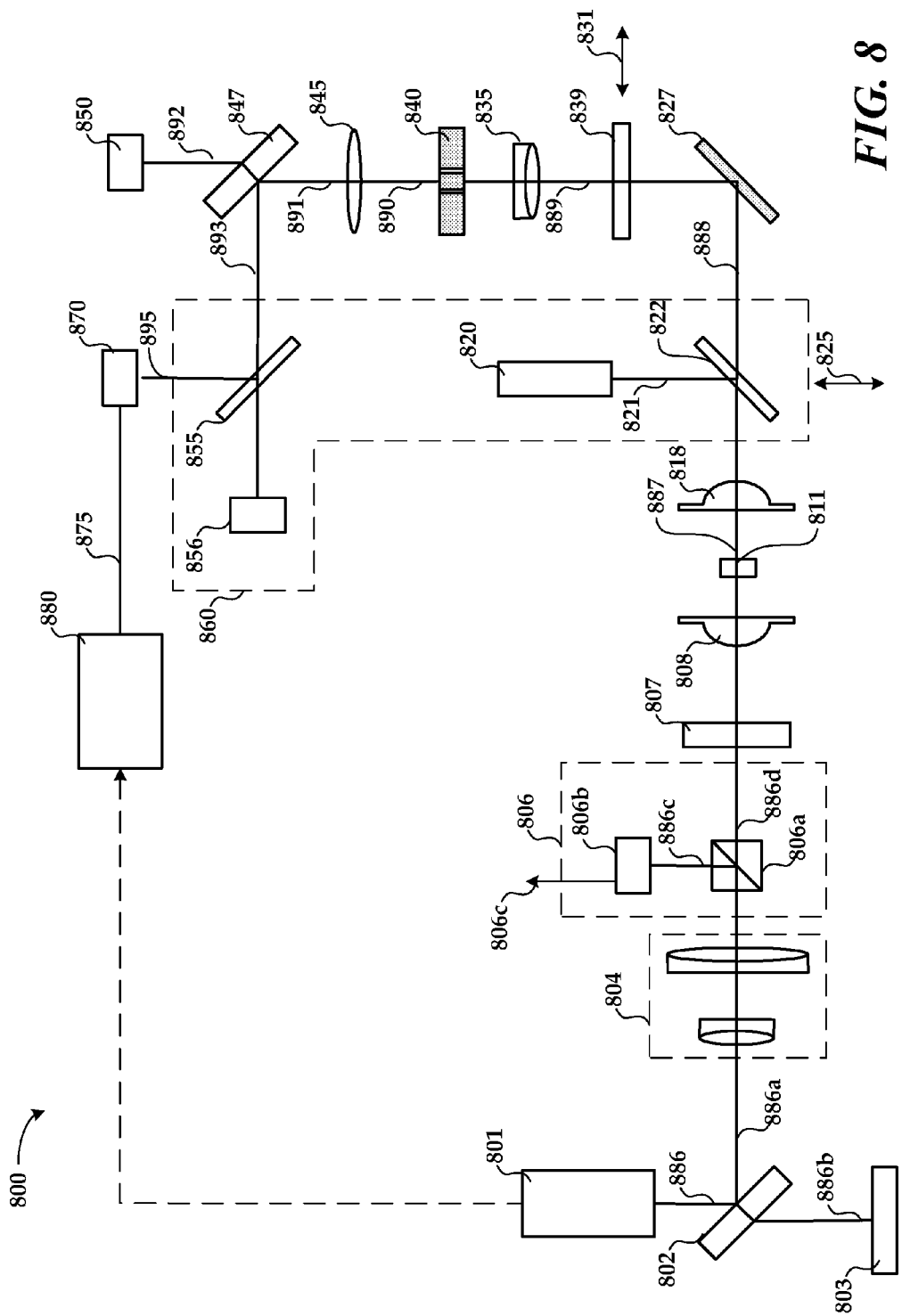
FIG. 8 is a block diagram of a characterization system according to various embodiments.

FIG. 8 shows an embodiment of a characterization subsystem 800 suitable for use in aligning a light emitting device to the input waveguide coupler of an NFT. As with the system of FIG. 6, the system of FIG. 8 also involves detecting photoluminescent light emanating from the NFT in response to excitation radiation and filtering using a shortwave pass filter.

As shown in FIG. 8, high energy excitation radiation is provided by a mode locked femtosecond or picosecond laser

801, e.g., a Ti:sapphire laser emitting 160 femto second pulses at a repetition rate of 76 MHz and having a wavelength of about 805 nm±10 nm. In some cases, it may be desirable to reduce the intensity of the excitation light 886 that is incident on the NFT subassembly under test. In these cases a beam sampler may be used to pass a portion of the excitation light to a beam dump. As illustrated in FIG. 8, the excitation light 886 emitted by the laser 801 reflects from an optional Fresnel beam sampler 802. A portion 886b of the excitation radiation is transmitted through the Fresnel sampler 802 to a beam dump 803. Another portion 886a of the excitation radiation is directed toward an optional beam expander 804 that expands the beam of the excitation radiation 886a emitted by the laser. In some cases, the system 800 optionally includes a subsystem 806 configured to monitor the excitation radiation 886a at the output of the beam expander 804. The optional excitation radiation monitor 806, can include, for example, a neutral, non-polarizing beam splitter cube 806a that splits off a sample 886c of the excitation radiation 886a and directs the sample radiation 886c to a photodetector 806b. The photodetector 806b generates a signal 806c in response to the incident sample radiation 886c.

The excitation radiation 886d passes through an achromatic half-wavelength waveplate 807 that rotates the polarization direction of radiation 886d to the desired direction for NFT excitation. The excitation radiation 886d is focused by focusing lens 808 onto the input waveguide coupler (or grating coupler) in subassembly 811 being tested. For example, a suitable lens for lens 808 is an aspherical lens that has a numerical aperture (NA) of about 0.25. In some test setups, the NFT subassembly 811 being tested is disposed on a bar 814 that includes many NFT subassemblies. In response to the excitation radiation 886d, the NFT subassembly 811 being tested emits photoluminescent radiation and also a portion of the excitation radiation is transmitted through the NFT subassembly 811. Thus, the radiation 887 emanating from the NFT subassembly 811 is a combination of the photoluminescent radiation and the excitation radiation, as previously discussed.

The combined radiation 887 output from the NFT subassembly 811 under test is collimated and collected by a lens 818 of high numerical aperture, e.g., NA of about 0.90. To image the radiation exiting surface of the NFT subassembly 811, the system 800 may include an imaging subsystem 860. The imaging subsystem includes a fiber bundle white light source 820 that provides white light 821 for imaging the NFT subassembly 811. The white light 821 is coupled into the light beam 888 by a broadband mirror 822. Arrow 825 indicates that components of the imaging subsystem, e.g., the white light source 821 and mirror 822 may be used for set up and then removed from the beam path. Radiation 588 includes excitation radiation transmitted through the NFT subassembly 811, includes photoluminescent radiation emitted by the NFT subassembly in response to the excitation radiation. In some configurations, the imaging system 860 is used to position the NFT subassembly 811. In these configurations, the white light 821 generated by the white light source 820 will not be a component of radiation 888 when the photoluminescence of the NFT subassembly 811 is being measured.

Figure 9:
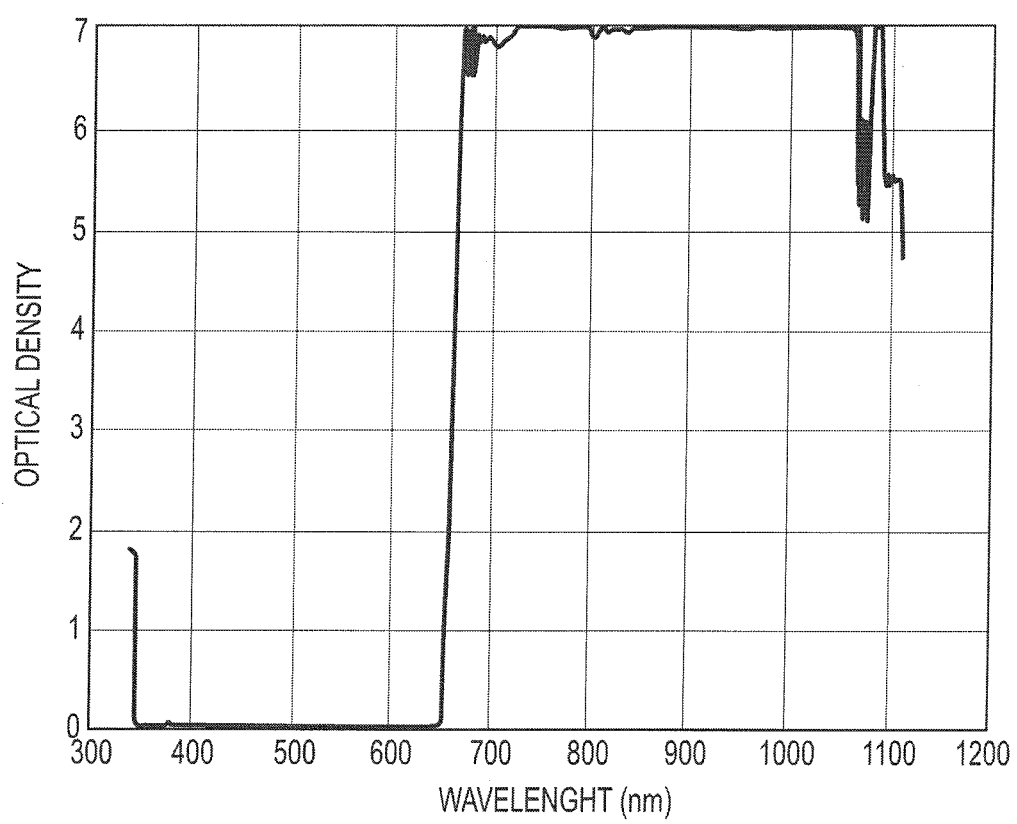
FIG. 9 shows a possible spectral characteristic for the shortwave pass filter used in the system of FIG. 8.

Radiation 888 is optionally redirected through mirror 827 and through a shortwave pass spectral filter 839. The shortwave pass filter 839 substantially blocks (absorbs) the excitation radiation and substantially passes a portion of the photoluminescent radiation emitted by the NFT. FIG. 9 shows a possible spectral characteristic for the filter 839. A filter having the characteristics of FIG. 9 has an optical density of $10^{-7}$ and blocks transmission by a factor of about $10^{-7}$ in the wavelength range longer than the cut-off wavelength (which is 650 nm in FIG. 9), where the excitation radiation (e.g., 805 nm±10 nm) is located. In contrast, the filter shown in FIG. 9 substantially passes radiation (has an optical density close to 0 or 100% transmission) in the wavelength range from about 320 nm to about 650 nm. Arrow 831 indicates that the filter 839 may be moved out of the radiation path during measurement of the transmitted excitation radiation.

Figure 10:
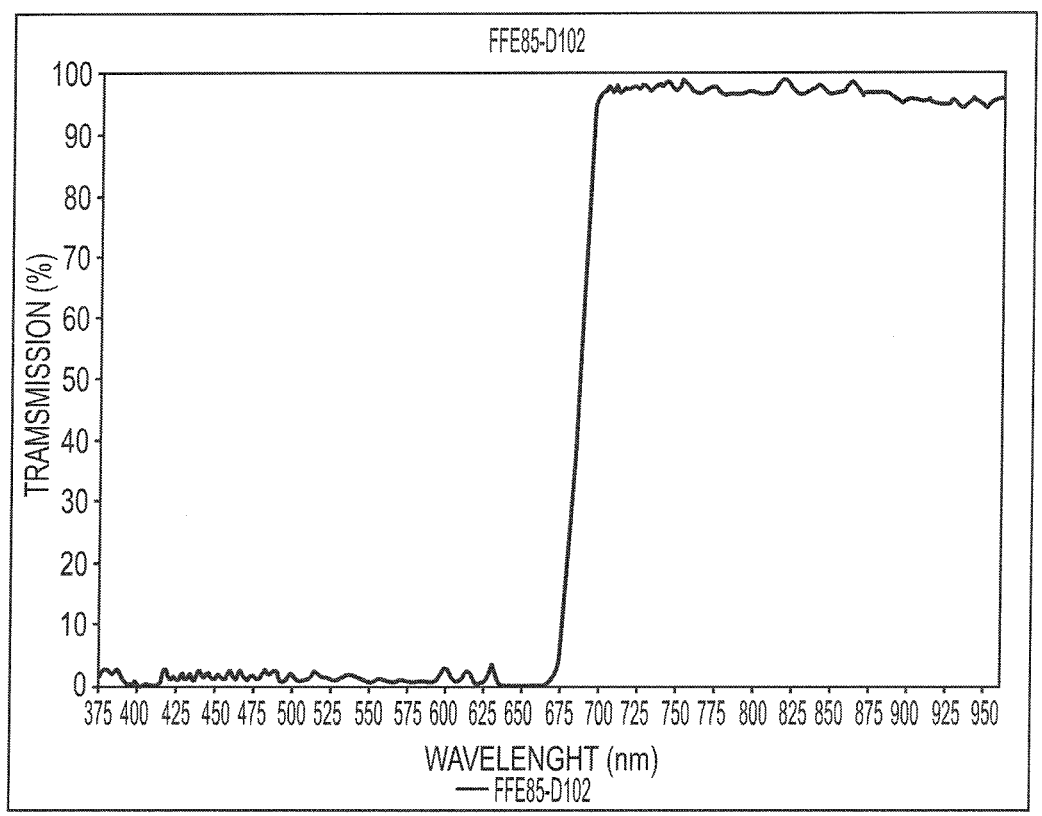
FIG. 10 shows a possible spectral characteristic of a suitable dichroic beam splitter used in the system of FIG. 8.

After the filter 839, a confocal detection scheme is used. Radiation 889 that passes through the filter 839 subsequently passes through a non-coated or broad-band coated plano-convex imaging lens 835 or a doublet. An iris diaphragm or a slit 840 is placed near the focal point of the imaging lens 835 to reduce the background noise. Radiation 890 that passes through the iris diaphragm or slit 840 is imaged by a biconvex lens 845 and through a dichroic beam splitter 847. The dichroic beam splitter 847 has a 685 nm edge that separates the incoming radiation 891 into two spectrally distinct beams. Any radiation with wavelength above the 685 nm edge is transmitted, whereas radiation with wavelength below the 685 nm edge is reflected. The spectral characteristic of a suitable dichroic beam splitter is shown in FIG. 10. The incoming radiation 981 is separated by the dichroic beam splitter 847 into a first radiation beam 892 with wavelength greater than 685 nm and a second radiation beam 893 with wavelength less than 685 nm. The shortwave pass filter 839 in combination with the dichroic beam splitter 847 reject the excitation radiation wavelengths from the second radiation beam 893 by a factor of about $10^{-7}$, or about $10^{-10}$ or even about $10^{-14}$.

The first radiation beam 892 is directed to a photodetector 850 configured to measure the excitation radiation transmitted through an NFT subassembly. The second radiation beam 893 comprises the components from the photoluminescence from the NFT under test 811 and the light from the white light source 820 that was reflected by the NFT bar 814. Optical element 855 directs the photoluminescent radiation to both or either of PMT 870 and CCD 856. Optical element 855 is on a translation stage and may be a beam splitter or moveable mirror. If optical element 855 is a moveable mirror, the moveable mirror directs the luminescence to PMT 870 or to CCD 856. If optical element 855 is a beam splitter, optical element directs the luminescence to both the PMT 870 and the CCD 856. With the white-light moved in the light path and without the presence of shortwave pass filter 839 in the light path, the light transmitted through a device, including the NFT radiation, and the white light 894 reflected from a device is imaged onto a cooled charge coupled device (CCD) that is a part of the imaging subsystem 860; with the white-light moved out of the light path and the shortwave pass filter 839 moved into the light path, the two-photon induced photoluminence from NFT is either directed to PMT 870 or CCD 856 if 855 is a mirror, or, is split into both PMT 870 and CCD 856 if 855 is a beam splitter. The photoluminescence image of the slider 811 can be viewed using the CCD without the presence of white light radiation and with the presence of shortwave pass filter. The white-light source is removed from the optical path to measure photoluminescence (imaging and detection).

The photoluminescence 895 is detected by detector 870, e.g., photomultiplier tube (PMT) or other type of detector. In response to the photoluminescence 895, the detector 870 generates an electrical signal 875 that is based on the amount of radiation incident on the detector 870. In some cases, the system may include a unit 880 configured to facilitate discerning a weak signal from a noisy background to enhance the signal to noise ratio of the electrical signal 875. In some cases, the SNR is enhanced by amplifying the electrical signal 875 using a lockin amplifier that is locked to the repetition frequency of the laser pulses. In some embodiments, the unit 880 may employ a photo-counting technique that uses an appropriate threshold to trigger the photon counting of the photoluminescence 895 by the detector 870.

Figure 6:
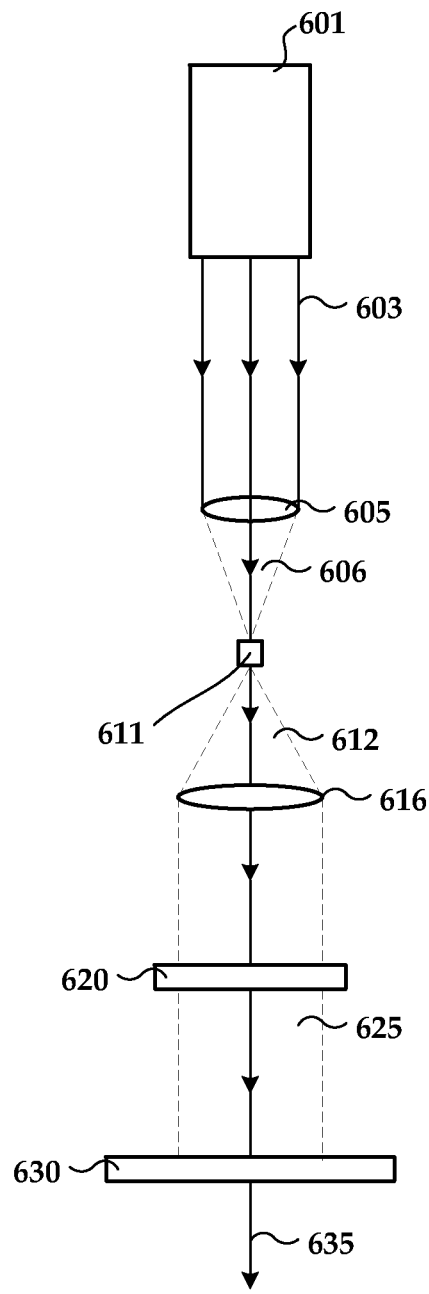
FIG. 6 depicts a characterization subassembly that may be used in the alignment subsystems in accordance with some embodiments.
Figure 7A:
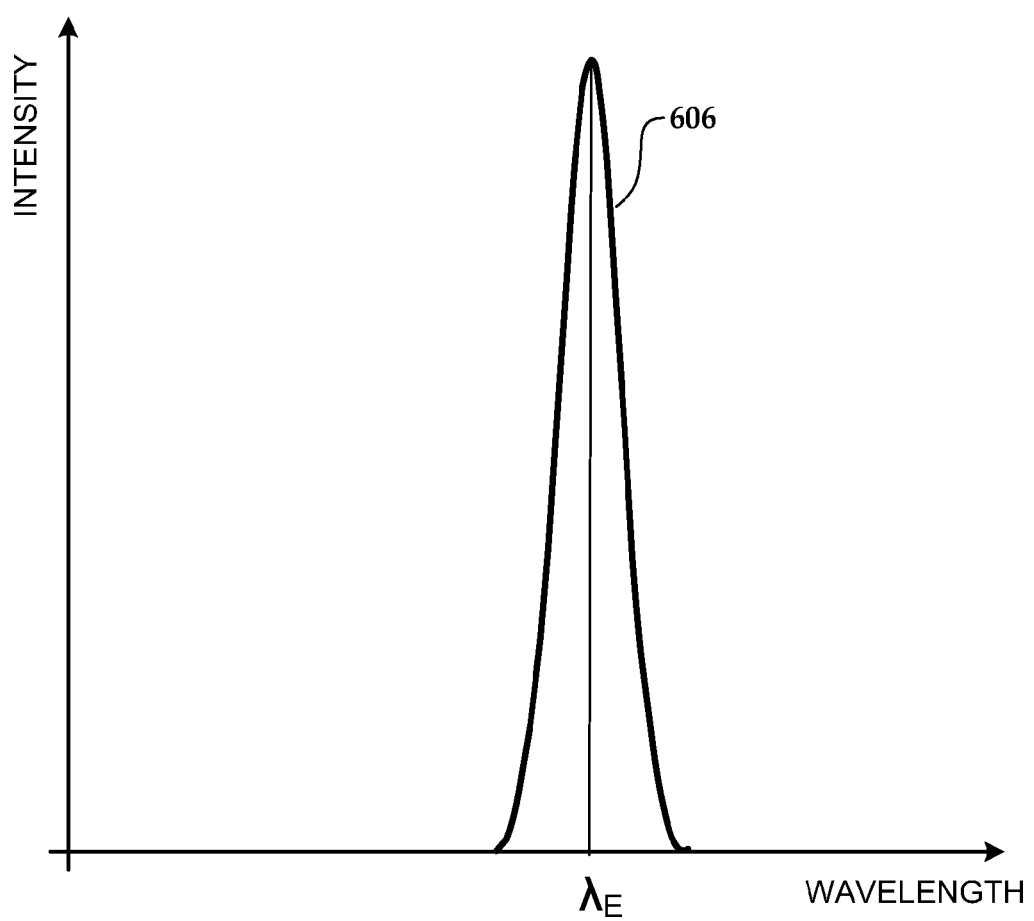
FIG. 7A provides an example spectral characteristic of the excitation radiation for the systems of FIGS. 3 and 5.
Figure 7B:
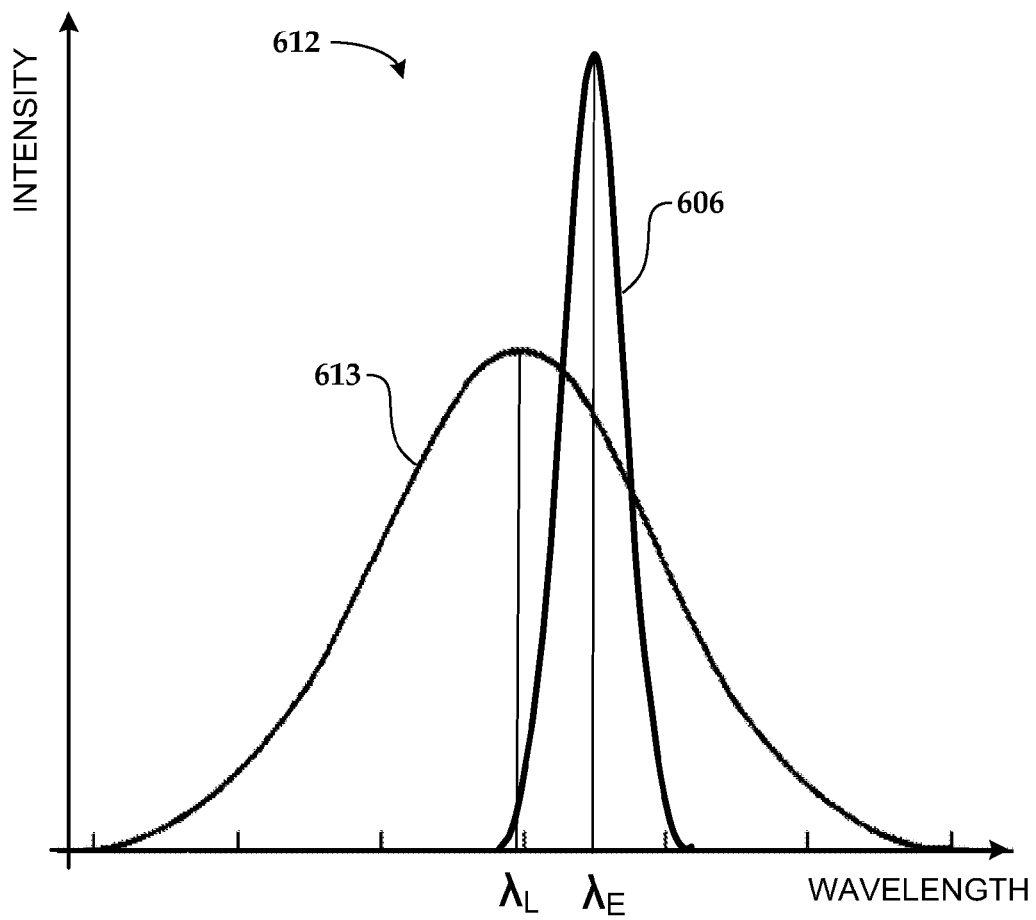
FIG. 7B provides an example spectral characteristic of photoluminescent radiation emitted by an NFT in response to the excitation radiation.
Figure 7C:
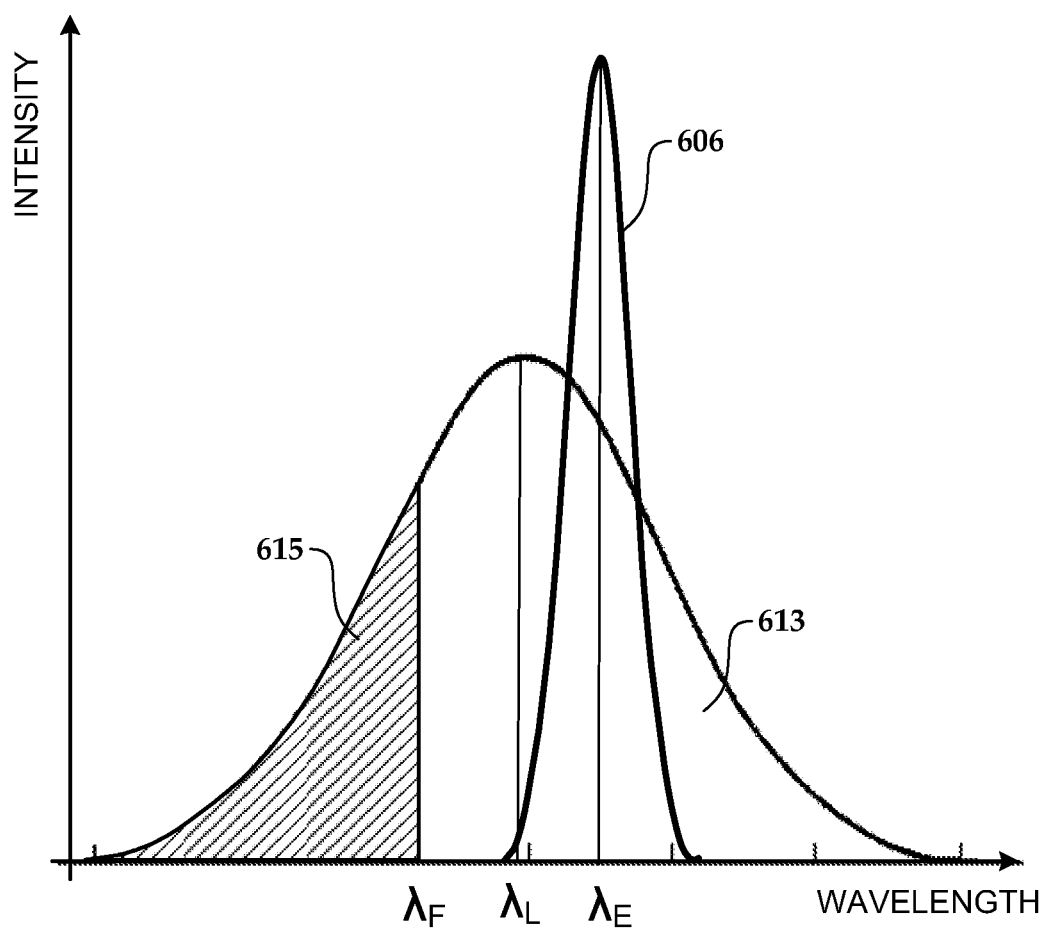
FIG. 7C illustrates shortwave pass filtered radiation that is used to characterize the NFT under test in accordance with various embodiments.

The characterization subsystems illustrated in FIGS. 6 and 8 can be used to identify the alignment position of the optical input coupler, e.g., with respect to a reference position such as the output point of the excitation laser light. The analyzer receives the signal generated by the detector 630, FIG. 6, 870, FIG. 8 and collects the signal amplitudes as the slider is moved through multiple positions by the control system and moveable stage.

Figure 11:
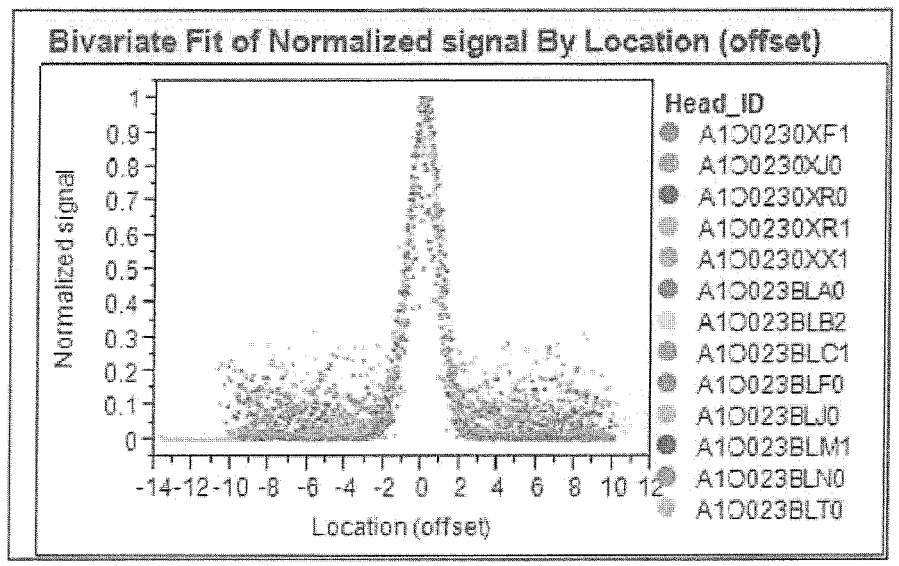
FIGS. 11 and 12 show normalized signal amplitudes with respect to position expressed as an offset from the reference position along the x and y axes, respectively, for a number of sample sliders.
Figure 12:
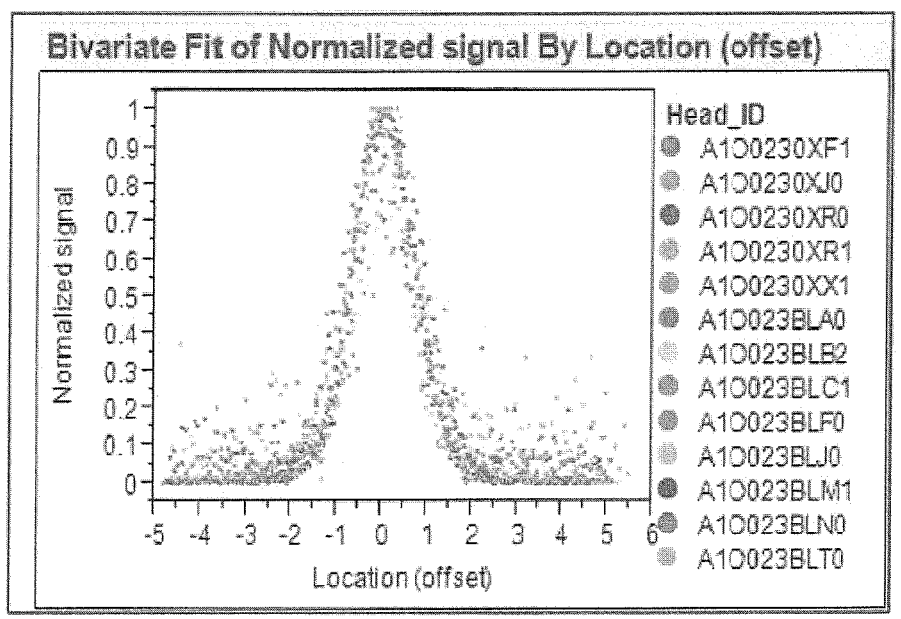

FIGS. 11 and 12 show normalized signal amplitudes with respect to position expressed as an offset from the reference position along the x and y axes, respectively, for a number of sample sliders. The signal amplitudes were determined using a characterization subsystem employing the shortwave pass filter technique as described above with respect to FIG. 6 or 8. The alignment coordinate for each sample slider along the x axis (cross track) can be identified by the analyzer as the offset position that corresponds to the peak amplitude of the signal along the x axis, as shown in FIG. 11. The alignment coordinate for each sample slider along the y axis (down track) can be identified by the analyzer as the position that corresponds to the peak amplitude of the signal along the y axis, as shown in FIG. 12.

Figure 13:
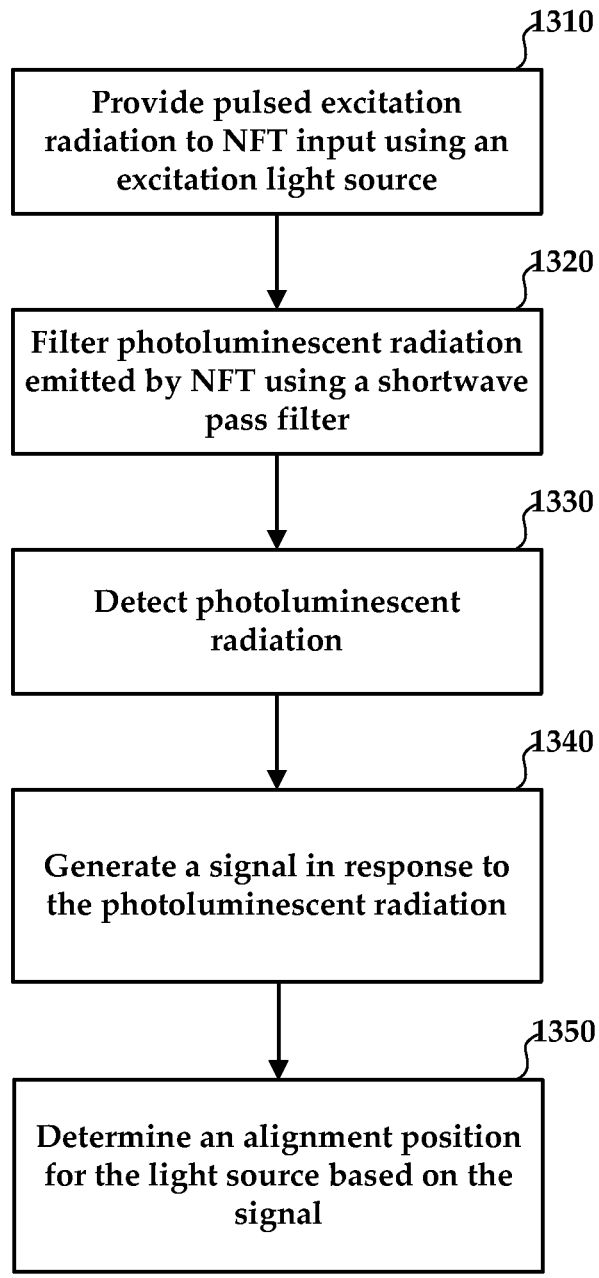
FIGS. 13-15 are flow diagrams illustrating alignment processes in accordance with various embodiments.

FIG. 13 is a flow diagram that illustrates a light source alignment process in accordance with some embodiments. The light source alignment process of FIG. 13 may be implemented, for example, by the systems illustrated in FIGS. 5A-5D. Excitation light pulses are provided 1310 to an optical input coupler for an NFT. The pulsed excitation radiation may include femtosecond, sub-picosecond or picosecond pulses, for example. In response to the excitation pulses, the NFT emits 1320 two-photon luminescent radiation. The photoluminescent radiation emitted by the NFT is filtered 1330 using a shortwave pass filter and is detected by a detector, e.g., photomultiplier tube (PMT) or solid state detector. The detector generates 1340 a signal in response to the detection of the filtered photoluminescent radiation signal. The alignment system scans through multiple positions for the optical input coupler and records an amplitude of the signal corresponding to each the multiple locations. The alignment position is identified based on 1350 the signal from the detector, e.g., the position that provides optimal, e.g., peak, photoluminescent output from the NFT.

Figure 14:
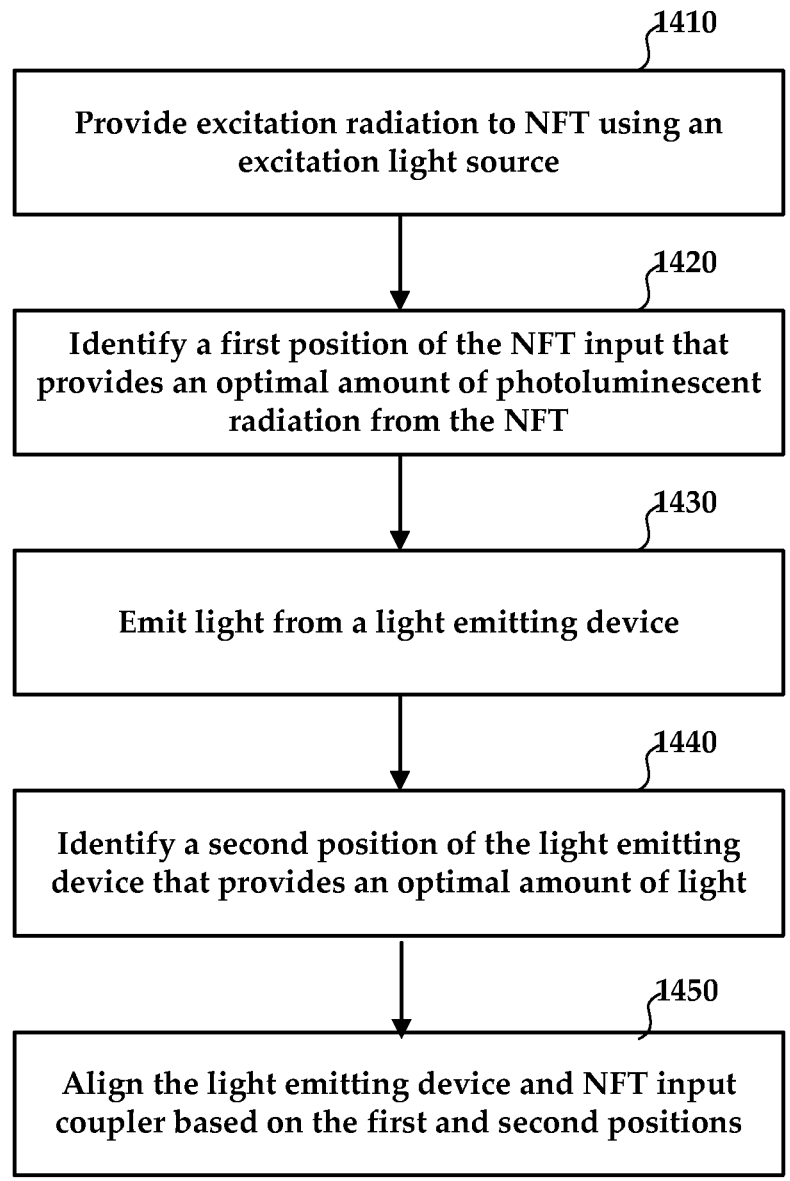

FIG. 14 illustrates another alignment process in accordance with some embodiments. The light source alignment process of FIG. 14 may be implemented, for example, by the systems illustrated in FIGS. 5A-5D. The process illustrated in FIG. 14 involves determining a first alignment position of the NFT input in the slider and a second alignment position of a light emitting device. The alignment between the light emitting device and the NFT is performed using the first and second positions and a known offset.

According the process illustrated in FIG. 14, pulsed excitation radiation is provided 1410 to an NFT input using an excitation light source. A first alignment position of the NFT input is identified 1420 based on the emitted photoluminescent radiation. The first alignment position is associated with optimal photoluminescent radiation from the NFT. Light is emitted 1430 by a light emitting device. A second alignment position is identified 1440. The second alignment position is associated with optimal light output from the light emitting device. The light emitting device is aligned 1450 with the NFT input coupler based on the first and second alignment positions.

Figure 15:
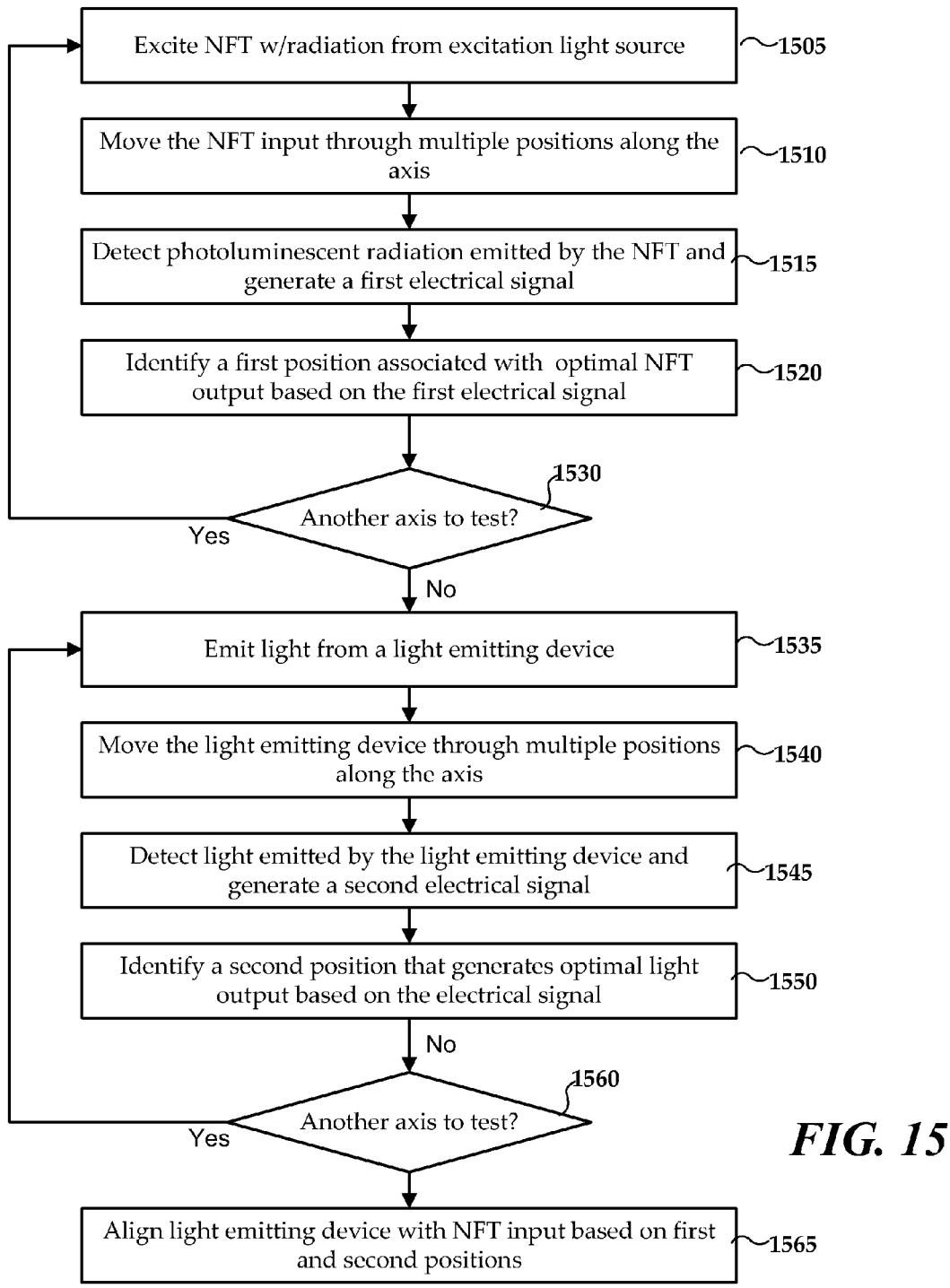

FIG. 15 shows a process for identification of multi-dimensional alignment positions in accordance with some embodiments. The light source alignment process of FIG. 15 may be implemented, for example, by the systems illustrated in FIGS. 5A-5D. An NFT is excited by pulsed radiation from an excitation light source 1505. The slider that incorporates the NFT and NFT optical input coupler is moved through a multiple positions 1510 along the axis. The photoluminescent radiation emitted by the NFT is detected 1515 and a first electrical signal is generated based on the detected photoluminescent radiation. A first alignment position referenced to a first reference position is identified 1520 based on the first electrical signal. The first alignment position is associated with an optimal photoluminescent output from the NFT. The system determines 1530 if another axis needs to be tested for alignment position. If so, the processes of blocks 1505-1520 are repeated for another axis.

If alignment position for all axes have been determined 1530, the next stage of alignment is implemented. Light is emitted 1535 from a light emitting device while the light emitting device is moved 1540 through multiple positions along the axis being tested. Light emitted by the light emitting device is detected 1545 and a second electrical signal is generated based on the detected light. A second alignment position referenced to a second reference position is identified 1550, the second alignment position associated with optimal light output from the light emitting device. The system determines 1560 if another axis needs to be tested for alignment position. If so, the processes of blocks 1535-1550 are repeated for another axis. If the alignment position for all axes have been determined, the light emitting device is aligned 1565 with the NFT optical input coupler based on the first and second alignment positions and a known offset between the first and second reference positions.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A system comprising:
   an excitation light source that provides excitation radiation through an optical input coupler to a near field transducer (NFT);
   a detector assembly comprising:

a shortwave pass optical filter that substantially passes photoluminescent radiation enhanced by local surface plasmons emitted by the NFT in response to the excitation radiation and that substantially blocks the excitation radiation; and a detector that detects the photoluminescent radiation and that generates an electrical signal in response to detection of the photoluminescent radiation; and an alignment subsystem that identifies an alignment position of a slider comprising the NFT and the optical input coupler with respect to the excitation light source based on the electrical signal, a position of the slider for plasmonic emission based on a peak output of the photoluminescent radiation.

2. The system of claim 1, wherein the alignment position is referenced to a reference position that corresponds to an exit point of the excitation radiation.

3. The system of claim 1, wherein the excitation radiation comprises femtosecond or sub-picosecond pulses.

4. The system of claim 1, wherein:
the optical input coupler and the NFT are components of a heat assisted magnetic recording (HAMR) slider; and
the excitation light source is a light emitting device suitable for use as a heat generating light source of the HAMR slider.

5. The system of claim 1, wherein the alignment system includes:
a mechanism that causes relative movement between the optical input coupler and a reference position through multiple positions in an x-y plane; and
an analyzer that:
senses for an indication of peak photoluminescence in the signal as the mechanism causes the relative movement; and
identifies the alignment position of the optical input coupler based on the indication of peak photoluminescence in the signal.

6. The system of claim 1, wherein the excitation radiation comprises femtosecond, sub-picosecond or picosecond laser pulses.

7. The system of claim 6, further comprising
a photo-counting unit that uses a threshold to trigger photon counting of the photoluminescent radiation.

8. A system comprising:
an excitation light source that outputs excitation light through an optical input coupler to a near field transducer (NFT);
a first detector assembly comprising:
a shortwave pass optical filter that substantially passes photoluminescent radiation enhanced by local surface plasmons emitted by the NFT in response to the excitation radiation and that substantially blocks the excitation radiation; and
a first detector that detects the photoluminescent radiation and that generates an electrical signal in response to detection of the portion of photoluminescent radiation;
a second detector assembly including a second detector that detects light emitted by a light emitting device configured to excite the NFT to emit plasmons, the second detector assembly generating at least one second electrical signal in response to detection of the light; and
an alignment subsystem that:
uses the first electrical signal to identify a first alignment position of a slider comprising the NFT and the optical input coupler that provides an amount of the photoluminescent radiation from the NFT based on a peak output of the photoluminescent radiation;
uses the second electrical signal to identify a second alignment position of the light emitting device that provides an amount of the light from the light emitting device based on the peak output of the photoluminescent radiation; and
determines an alignment of the light emitting device and the slider based on the first and second positions, an alignment between the light emitting device and the slider for plasmonic emission of the NFT based on the peak output of the photoluminescent radiation.

9. The system of claim 8, wherein:
the NFT and the optical input coupler are components of heat assisted magnetic recording (HAMR) slider;
the alignment subsystem includes:
first and second moveable stages;
a control system that controls the first moveable stage to cause relative movement between the slider and a first reference position and that controls the second moveable stage to cause relative movement between the light source and a second reference position, the second reference position offset from first reference location by a predetermined amount in at least one dimension.

10. The system of claim 9, wherein the second reference position is offset from the first reference location by a predetermined amount, Δx, along an x axis and is offset by a predetermined amount, Δy, along an orthogonal y axis.

11. The system of claim 9, wherein:
the first reference position is a position of the excitation light source;
the control system controls the first moveable stage to move the NFT subassembly through multiple positions relative to the position of the excitation light source;
the alignment system includes an analyzer that:
receives the first electrical signal;
correlates an amplitude of the first electrical signal with each of the multiple positions; and
identifies the optimal alignment position of the NFT subassembly relative to the excitation light source, the optical alignment position correlated to a peak amplitude of the first electrical signal.

12. The system of claim 9, wherein:
the second reference position is an input location of the second detector;
the control system controls the second moveable stage to move the light source through multiple positions relative to the input location of the second detector;
the alignment system includes an analyzer that:
receives the second electrical signal;
correllates an amplitude of the second electrical signal with each of the multiple positions; and
identifies the second alignment position of the light source relative to the input location, the second alignment position correlated to a peak amplitude of the second electrical signal.

13. The system of claim 12, wherein:
the second detector assembly comprises a quadrant photodetector; and
the second reference position corresponds to a balance point of the quadrant photodetector.

14. The system of claim 12, wherein:
the second detector assembly comprises an aperture aligned with an optical fiber and a photodetector; and
the second reference position corresponds to the aperture.

15. A method, comprising:
providing excitation radiation from an excitation light source through an optical input coupler to a near field transducer (NFT);
filtering output radiation from the NFT using a short wavelength pass optical filter, the filtering comprising passing a portion of photoluminescent radiation emitted by the NFT in response to the excitation radiation and substantially blocking the excitation radiation; and
detecting the portion of photoluminescent radiation and generating an electrical signal based on a peak output of the photoluminescent radiation in response to the detecting; and
determining an alignment position of the excitation light source and a slider for plasmonic emission from the NFT based on the signal.

16. The method of claim 15, wherein providing the excitation radiation comprises providing picosecond pulses from the excitation light source.

17. The method of claim 15, wherein:
the optical input coupler and the NFT are components of a heat assisted magnetic recording slider; and
the excitation light source is a laser diode capable of being used as a heat generating light source of the HAMR slider.

18. The method of claim 15, wherein
determining the alignment position comprises:
scanning the optical input coupler and NFT through multiple positions relative to a position of the excitation light source;
correlating an amplitude of the signal with each of the multiple positions; and
identifying the alignment position correlated to a peak amplitude of the signal.

19. A method, comprising:
providing excitation radiation from an excitation light source through an optical input coupler to a near field transducer (NFT);
filtering output radiation from the NFT using a short wavelength pass optical filter, the filtering comprising passing photoluminescent radiation enhanced by plasmons emitted by the NFT in response to the excitation radiation and substantially blocking the excitation radiation; and
scanning the optical input coupler through multiple positions;
detecting the photoluminescent radiation for each of the multiple positions and generating a first electrical signal based on a peak output of photoluminescent radiation in response to the detecting; and
identifying a first alignment position of a slider comprising the NFT and the optical input coupler based on the first electrical signal;
emitting light from a light emitting device configured to excite the NFT to emit plasmons;
scanning the light emitting device through multiple positions; and
detecting the light for each of the multiple positions and generating a second electrical signal based on the peak output of photoluminescent radiation in response to detecting the light;
identifying a second alignment position of the light emitting device based on the second electrical signal; and
aligning the light emitting device with the slider for plasmonic emission of the NFT based on the first and second alignment positions.

20. The method of claim 19, wherein:
identifying the first alignment position comprises correlating an amplitude of the first electrical signal with each of the multiple positions, wherein the first alignment position is correlated to a peak amplitude of the first electrical signal; and
identifying the second alignment position comprises correlating an amplitude of the second signal with each of the multiple positions, wherein the second alignment position is correlated to a peak amplitude of the second electrical signal.

21. The method of claim 19, wherein:
identifying a first alignment position comprises identifying the first alignment position relative to a first reference position;
identifying the second alignment position comprises identifying the second alignment position relative to a second alignment position, wherein an offset between the first reference position and the second reference position is a predetermined value.

* * * * *